US012812141B2

(12) United States Patent
Galpin et al.

(10) Patent No.: US 12,812,141 B2
(45) Date of Patent: Nov. 24, 2026

(54) METHODS AND APPARATUSES FOR ENCODING/DECODING A VIDEO

(71) Applicant: InterDigital CE Patent Holdings, SAS, Paris (FR)

(72) Inventors: Franck Galpin, Thorigne-Fouillard (FR); Karam Naser, Mouaze (FR); Philippe Bordes, Laille (FR); Fabrice Le Léannec, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/696,765

(22) PCT Filed: Sep. 15, 2022

(86) PCT No.: PCT/EP2022/075691
§ 371 (c)(1),
(2) Date: Mar. 28, 2024

(87) PCT Pub. No.: WO2023/052141
PCT Pub. Date: Apr. 6, 2023

(65) Prior Publication Data

US 2024/0397064 A1 Nov. 28, 2024

(30) Foreign Application Priority Data

Sep. 29, 2021 (EP) .................................... 21306350

(51) Int. Cl.
*H04N 19/189* (2014.01)
*H04N 19/30* (2014.01)
*H04N 19/70* (2014.01)

(52) U.S. Cl.
CPC ........... *H04N 19/189* (2014.11); *H04N 19/30* (2014.11); *H04N 19/70* (2014.11)

(58) Field of Classification Search
CPC ...... H04N 19/189; H04N 19/30; H04N 19/70; H04N 19/132; H04N 19/48; H04N 19/523;
(Continued)

(56) References Cited

U.S. PATENT DOCUMENTS 9,432,696 B2 8/2016 Chong et al.
11,943,431 B2 * 3/2024 Wang ..................... H04N 19/14
(Continued)

FOREIGN PATENT DOCUMENTS

WO WO 9907154 A1 2/1999

OTHER PUBLICATIONS

Bross et al., "Versatile Video Coding (Draft 10)", Joint Video Experts Team (JVET) of ITU-T SG 16 WP3 and ISO/IEC JTC 1/SC 29/WG 11, Document: JVET-S2001_vB, 19th meeting, Teleconference, Jun. 22, 2020, 547 pages.
(Continued)

*Primary Examiner* — Maria E Vazquez Colon
(74) *Attorney, Agent, or Firm* — Condo Roccia Koptiw LLP

(57) ABSTRACT

At least a method and an apparatus are presented for efficiently encoding or decoding video. For example, video data representative of a part of a picture is obtained, at least one syntax data element specifying to adapt the encoding/decoding to emulate a reduced resolution applied to the part of the picture is signaled; and video data is encoded/decoded wherein at least one process of the encoding/decoding is adapted to emulate a reduced resolution applied to the part of the picture.

20 Claims, 12 Drawing Sheets

(58) Field of Classification Search
CPC ...... H04N 19/85; H04N 19/147; H04N 19/17; H04N 19/172; H04N 19/137; H04N 19/186; H04N 19/63
See application file for complete search history.

(56) References Cited

U.S. PATENT DOCUMENTS

| | | | | |
|---|---|---|---|---|
| 2020/0404279 | A1* | 12/2020 | Choi | H04N 19/132 |
| 2021/0274197 | A1 | 9/2021 | Lee et al. | |
| 2021/0321138 | A1* | 10/2021 | Samuelsson | H04N 19/70 |
| 2021/0368208 | A1* | 11/2021 | Samuelsson | H04N 19/184 |
| 2024/0098254 | A1* | 3/2024 | Deng | H04N 19/105 |
| 2024/0323367 | A1* | 9/2024 | Bordes | H04N 19/117 |

OTHER PUBLICATIONS

"Infrastructure of audiovisual services—Coding of moving video—Reference software for Itu-T H.265 high efficiency video coding", International Telecommunication Union, ITU-T Telecommunication Standardization Sector of ITU, Series H: Audiovisual and Multimedia Systems, Recommendation ITU-T H.265.2, Oct. 2014, 12 pages.
Sullivan et al., "Report of the 7th meeting of the Joint Collaborative Team on Video Coding (JCT-VC)", International Telecommunication Union, Telecommunication Standardization Sector, Study Group 16, Study Period 2009-2012, Document: TD 240 (WP 3/16), Geneva, Switzerland, Apr. 30, 2012, 324 pages.
"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.
Ikai et al., "On sao_merge_left_flag for effective Mxl CTB coding", Joint Collaborative Team on Video Coding (JCT-VC) of ITU-T SG 16 WP 3 and ISO/IEC JTC1/SC29/WG11, Document: JCTVC-J0179, 10th Meeting: Stockholm, Sweden, Jul. 11, 2012, 7 pages.
Wenger et al., "[AHG19] On Signaling of Adaptive Resolution Change", Joint Video Experts Team (JVET) of ITU-T SG 16 WP 3 and ISO/IEC JTC 1/SC 29/WG 11, Document: JVET-N0052, 14th Meeting, Geneva, Switzerland, Mar. 19, 2019, 11 pages.
Drugeon et al., "AHG15: Sps and PPS syntax modifications", Joint Collaborative Team on Video Coding of ISO/IEC JTC1/SC29/WG11and ITU-T SG.16, Document: JCTVC-H0380, 8th Meeting, San Jose, California, United States, Feb. 1, 2012, 6 pages.
Zheng et al., "Adaptive Block Coding Order for Intra Prediction in HEVC", Institute of Electronics and Electrical Engineers (IEEE), IEEE Transactions on Circuits and Systems for Video Technology, USA, vol. 26, Issue No. 11, Nov. 2016, 7 pages.
Wang et al., "Adaptive Motion Vector Resolution Scheme for Enhanced Video Coding", Institute of Electronics and Electrical Engineers (IEEE), 2016 Data Compression Conference (DCC), Snowbird, Utah, USA, Mar. 30, 2016, 10 pages.
"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.

* cited by examiner

METHODS AND APPARATUSES FOR ENCODING/DECODING A VIDEO

CROSS REFERENCE TO RELATED APPLICATIONS

This application is a U.S. National Stage Application under 35 U.S.C. § 371 of International Patent Application No. PCT/EP2022/075691, filed Sep. 15, 2022, which is incorporated herein by reference in its entirety.

This application claims priority to European Application No. 21306350.6, filed Sep. 29, 2021, which is incorporated herein by reference in its entirety.

TECHNICAL FIELD

At least one of the present embodiments generally relates to a method or an apparatus for video encoding or decoding, and more particularly, to methods or apparatuses for video encoding or decoding, wherein at least one syntax data element specifying to adapt the encoding or decoding to emulate a reduced resolution applied to a part of the picture is signaled.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

According to a particular feature, the Reference Picture Resampling (RPR), original and reconstructed pictures are dynamically re-scaled for the sake of better trade-off between coding efficiency and complexity than classical video coding at constant picture resolution. However, the RPR prevents the use of some tools because the reference picture and the current picture are not at the same spatial resolution. Existing methods for coding and decoding show some limitations with RPR. Therefore, there is a need to improve the state of the art.

SUMMARY

The drawbacks and disadvantages of the prior art are solved and addressed by the general aspects described herein.

According to a first aspect, there is provided a method. The method comprises video decoding by obtaining video data representative of a part of a picture; decoding at least one syntax data element specifying to adapt the decoding to emulate a reduced resolution applied to the part of the picture; and decoding video data wherein at least one process of the decoding is adapted to emulate a reduced resolution applied to the part of the picture.

According to another aspect, there is provided a second method. The method comprises video encoding by obtaining video data to encode representative of a part of a picture; encoding at least one syntax data element specifying to adapt the encoding to emulate a reduced resolution applied to the part of the picture; and encoding video data wherein at least one process of the encoding is adapted to emulate a reduced resolution applied to the part of the picture.

According to another aspect, there is provided an apparatus. The apparatus comprises one or more processors, wherein the one or more processors are configured to implement the method for video decoding according to any of its variants. According to another aspect, the apparatus for video decoding comprises means for obtaining video data representative of a part of a picture; means for decoding at least one syntax data element specifying to adapt the decoding to emulate a reduced resolution applied to the part of the picture; and means for decoding video data wherein means for decoding are adapted to emulate a reduced resolution applied to the part of the picture.

According to another aspect, there is provided another apparatus. The apparatus comprises one or more processors, wherein the one or more processors are configured to implement the method for video encoding according to any of its variants. According to another aspect, the apparatus for video encoding comprises means for obtaining video data to encode representative of a part of a picture; means for encoding at least one syntax data element specifying to adapt the encoding to emulate a reduced resolution applied to the part of the picture; and means for encoding video data wherein the means for encoding are adapted to emulate a reduced resolution applied to the part of the picture.

According to another general aspect of at least one embodiment, at least one syntax data element specifying the reduced resolution of the picture is further encoded/decoded.

According to another general aspect of at least one embodiment, syntax data used to specify the size of a picture according to a change of resolution of the picture are used to implicitly derive the reduced resolution of the part of the picture.

According to another general aspect of at least one embodiment, at least one syntax data element specifying the reduced resolution of the picture is added to syntax data used to specify the size of a picture for a change of resolution of the picture.

According to another general aspect of at least one embodiment, the at least one process of the encoding or decoding adapted to emulate a reduced resolution is one of a transform, a motion compensation, partitioning, post-filtering, decoding order.

According to another general aspect of at least one embodiment, at least one of CU size constraints on the picture are adapted to emulate reduced resolution.

According to another general aspect of at least one embodiment, the at least one syntax data element specifying to adapt the decoding to emulate a reduced resolution applied to the part of the picture, or at least one syntax data element specifying the reduced resolution of the picture, or the at least one syntax data element specifying the reduced resolution of the picture added to syntax data already used to specify the size of a picture for a change of resolution of the picture are signaled in one of a slice, a Picture Parameter Set (PPS), a Sequence Parameter Set (SPS), an Adaptation Parameter Set (APS).

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image. They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to method for encoding or decoding a video wherein at least one syntax data element specifying to adapt the encoding or decoding to emulate a reduced resolution applied to the part of the picture is signaled. In contrast to regular Reference Picture Resampling (RPR) where original and reconstructed pictures are dynamically re-scaled for the sake of better trade-off between coding efficiency and complexity than classical video coding at constant picture resolution, the encoding and decoding process is performed at constant resolution between original and reconstructed picture but the tools are adapted to reduce the amount of coded video data by reducing the resolution of the coded data.

Figure 1:
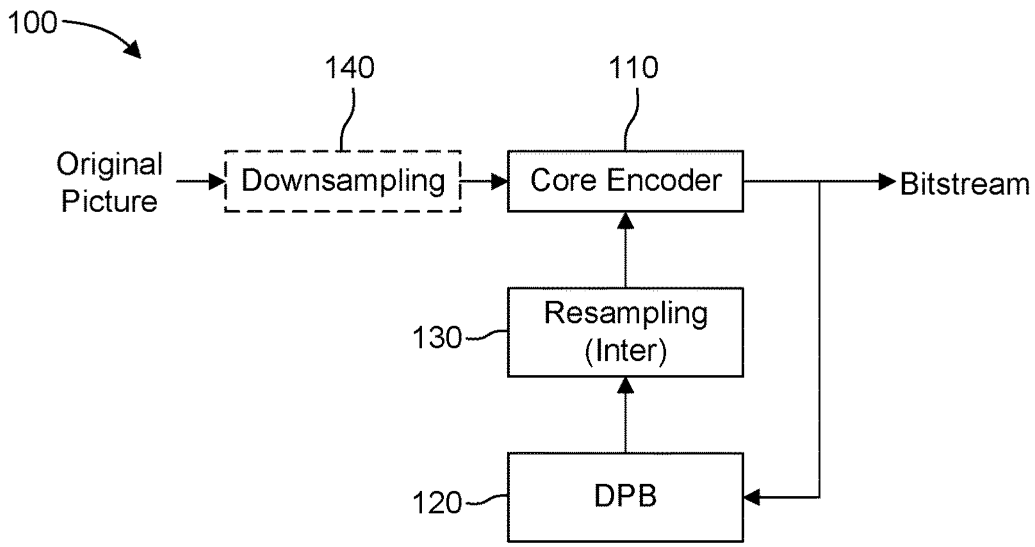
FIG. 1 illustrates an encoding method in which original pictures and reconstructed pictures are dynamically rescaled such as with the RPR.
Figure 2:
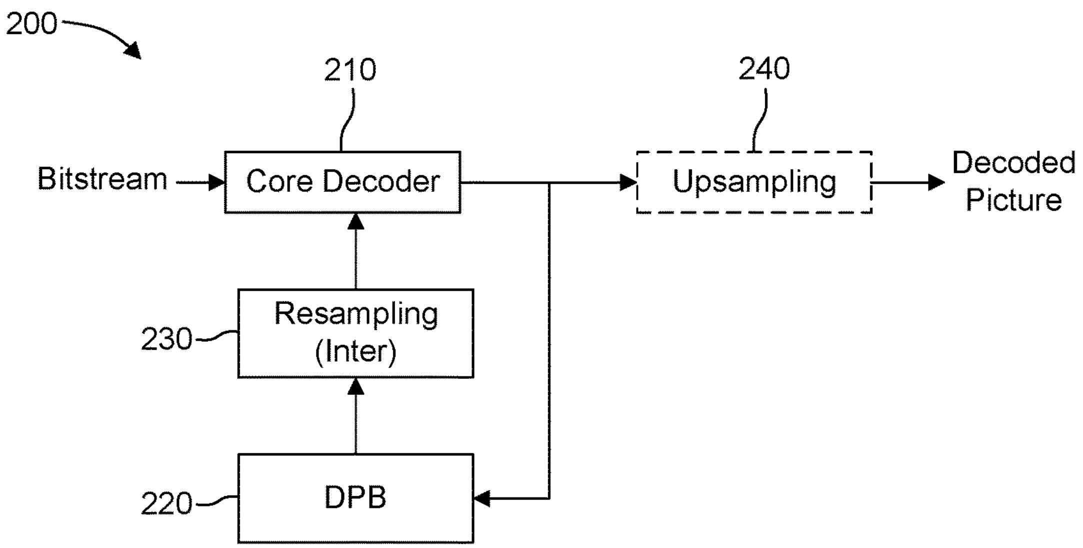
FIG. 2 illustrates a decoding method in which original pictures and reconstructed pictures are dynamically rescaled such as with the RPR.

FIGS. 1 and 2 respectively illustrate an encoding method (100) and a decoding method (200) in which original pictures and reconstructed pictures are dynamically rescaled, such as with the RPR (for Reference Picture Resampling) tool of VVC. For instance, such encoder and decoder can be compliant with the VVC standard.

Given an original video sequence composed of pictures of size (picWidth×picHeight), the encoder may choose for each frame the resolution (picture size) for coding the frame. Different PPS (for Picture Parameter Sets) are coded in the bit-stream and indicate the size of the pictures. Then, the slice/picture header indicates which PPS to use to decode the current VCL (Video Coding Layer) NAL unit that contains the coded slice. The picture size of the original video sequence is signaled in the SPS (for Sequence Parameter Set).

The down-sampler (140) and the up-sampler (240) functions used as pre- or post-processing respectively are not specified by some existing video compression standards such as HEVC, or VVC.

For each frame, the encoder chooses whether to encode at original or down-sized resolution (ex: picture width/height divided by 2). The choice can be made with two passes encoding or considering spatial and temporal activity in the original pictures. Consequently, the decoded picture buffer (DPB) can contain pictures with size different from the current picture size.

In case the reference picture in the DPB has size different from the current picture, the re-scaling (130/230) (up-scale resampling or down-scale resampling) of the reference block to build the prediction block is made implicitly during the motion compensation process.

Figure 3:
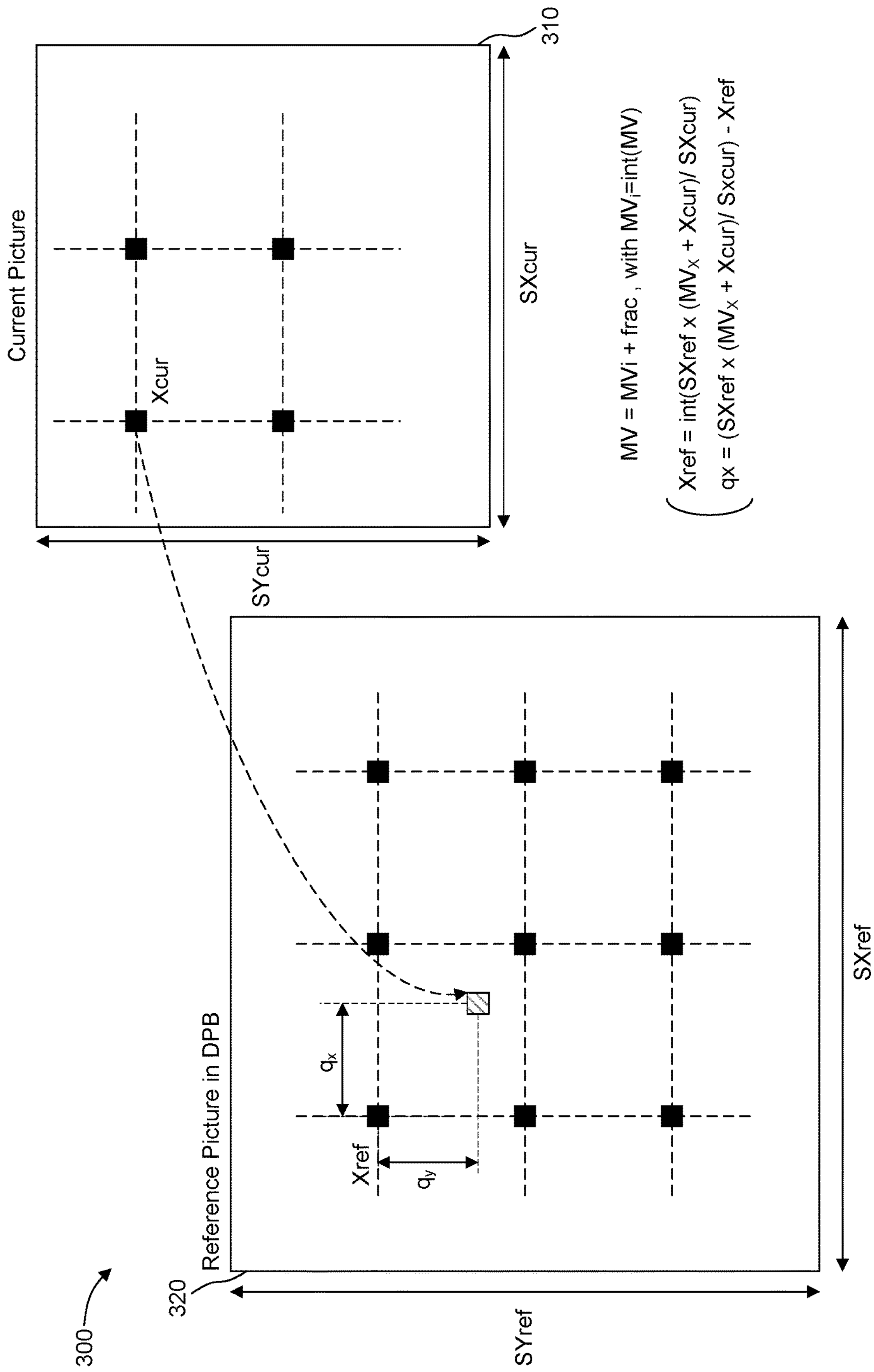
FIG. 3 illustrates a current block and corresponding reference block in the reference picture according to an embodiment of the RPR.

FIG. 3 illustrates a current block and corresponding reference block in the reference picture according to an embodiment of RPR. To predict the current block prediction P (310) of size (SXcur, SYcur), for each sample Xcur of P one calculates its position in the reference picture (Xref, Yref). The values of (Xref, Yref) is function of the motion vector (MVx, MVy) and of the scaling ratio between the current block size and the corresponding region in the reference picture (SXref, SYref) (320).

Let's denote (⊖x, ⊖y) the phase that is the non-integer part of motion compensated point (Xref, Yref) in the reference picture, as shown in FIG. 3. One has the following equation:

$$Xref = \text{int}(SXref \times (MVX + Xcur)/SXcur) \quad \text{(eq. 1)}$$

$$Yref = \text{int}(SYref \times (MVY + Ycur)/SYcur)$$

$$\ominus x = (SXref \times (MVi + Xcur)/SXcur) - Xref$$

$$\ominus y = (SYref \times (MVi + Ycur)/SYcur) - Yref$$

In VVC, the value "SXref/SXcur" is replaced with a value "scalingRatio" with power of 2 division in order to replace division with shift. The motion compensation (MC) uses two separate 1D filters to reduce amount of calculation.

Figure 4:
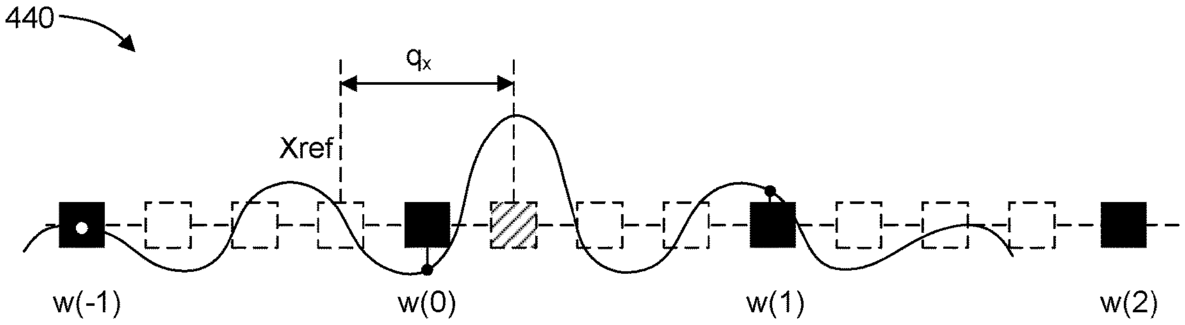
FIG. 4 illustrates a 1D filtering used in motion compensation according to an embodiment of the RPR.
Figure 5:
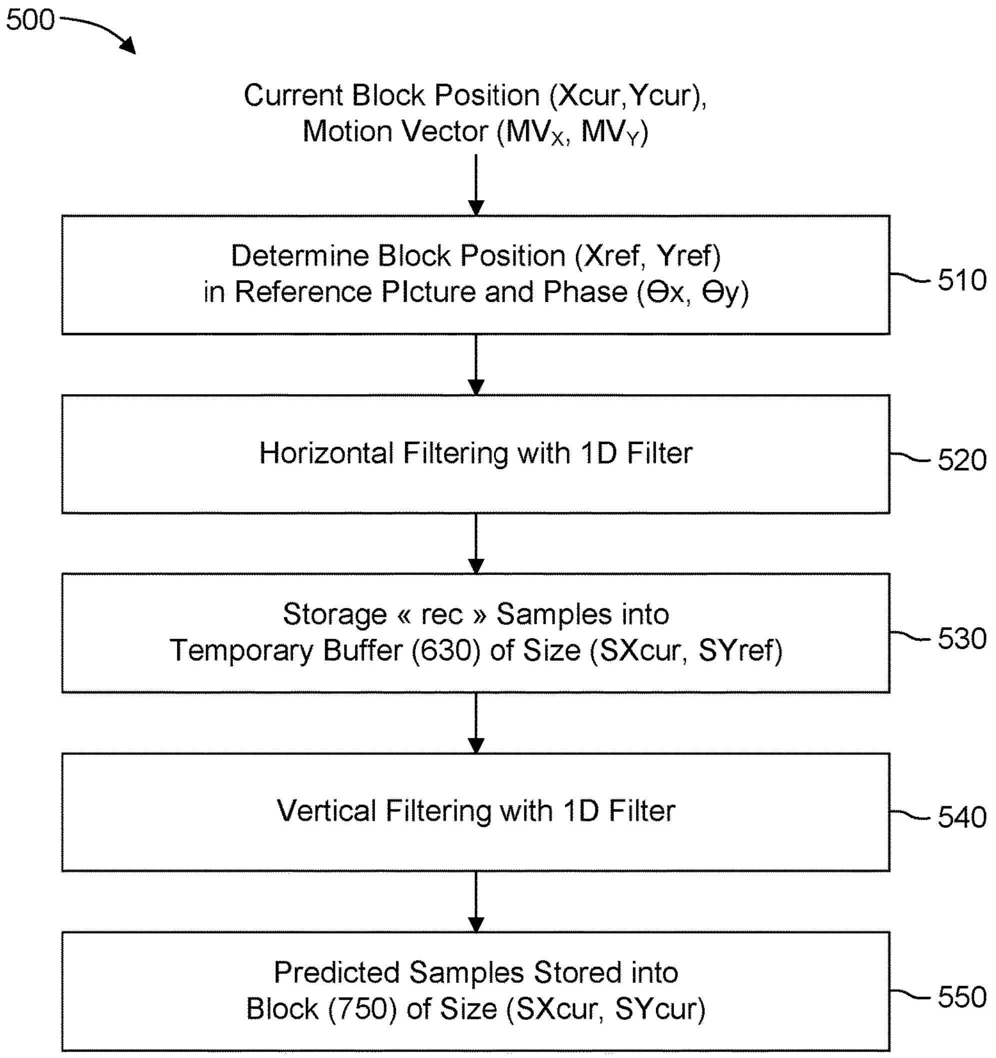
FIG. 5 illustrates a two stages motion compensation filtering according to an embodiment of the RPR.

FIG. 4 illustrates a 1D filtering used in motion compensation according to an embodiment related to the RPR and FIG. 5 illustrates a two stages motion compensation filtering (500) according to an embodiment related to the RPR. The motion compensation (500) with RPR comprises a first horizontal (520, 600) motion compensation filtering and a second vertical (540, 700) motion compensation filtering. The horizontal and vertical filtering are processed sequentially in any order since they are separate filters. Thus, according to a variant to the embodiment of FIG. 5, a first vertical motion compensation filtering is followed by a second horizontal motion compensation filtering.

Figure 6:
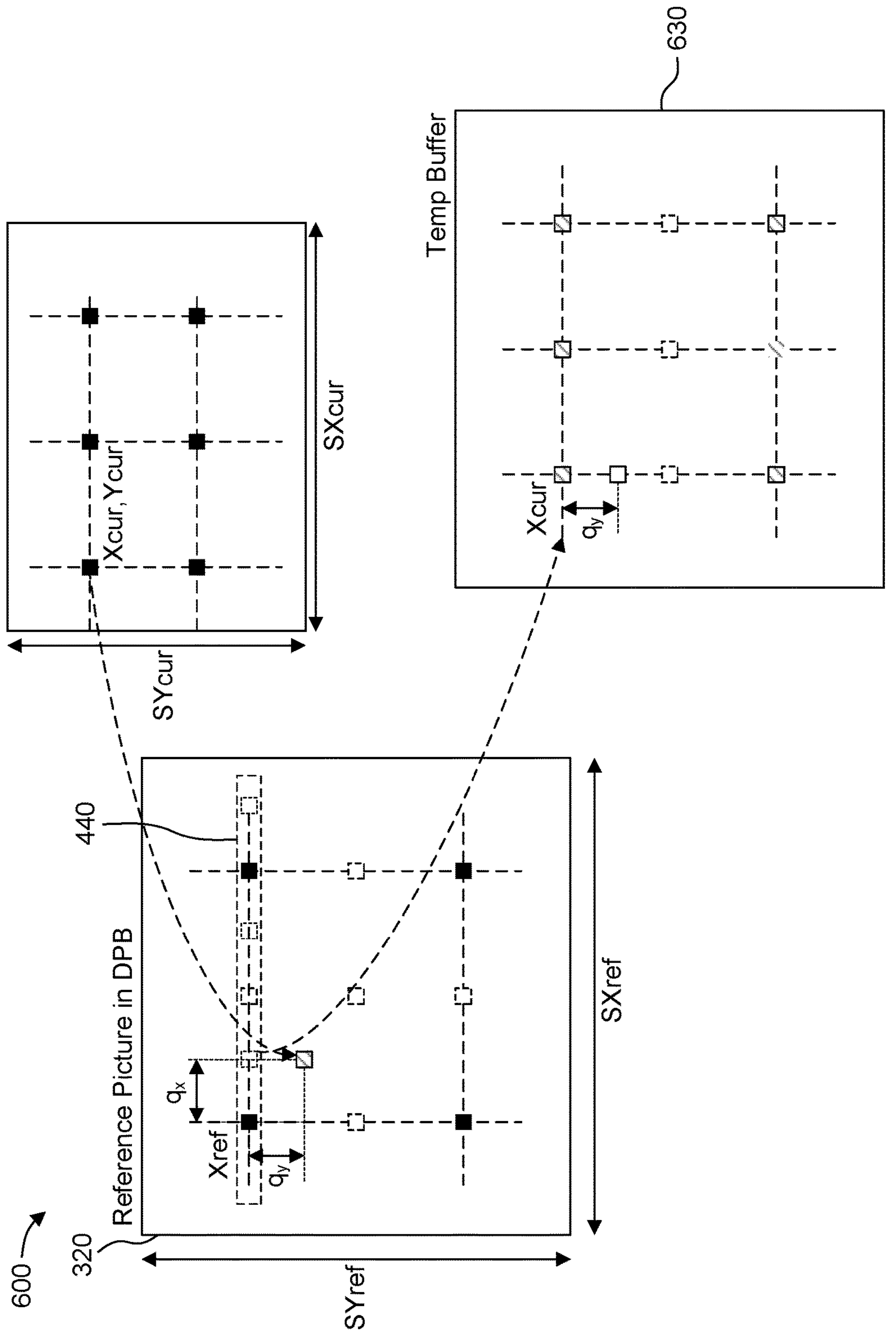
FIG. 6 illustrates a horizontal filtering in the two stages motion compensation filtering according to an embodiment of the RPR.

FIG. 6 illustrates a horizontal filtering (600) in the two stages motion compensation filtering (500) according to an embodiment of the RPR.

Figure 7:
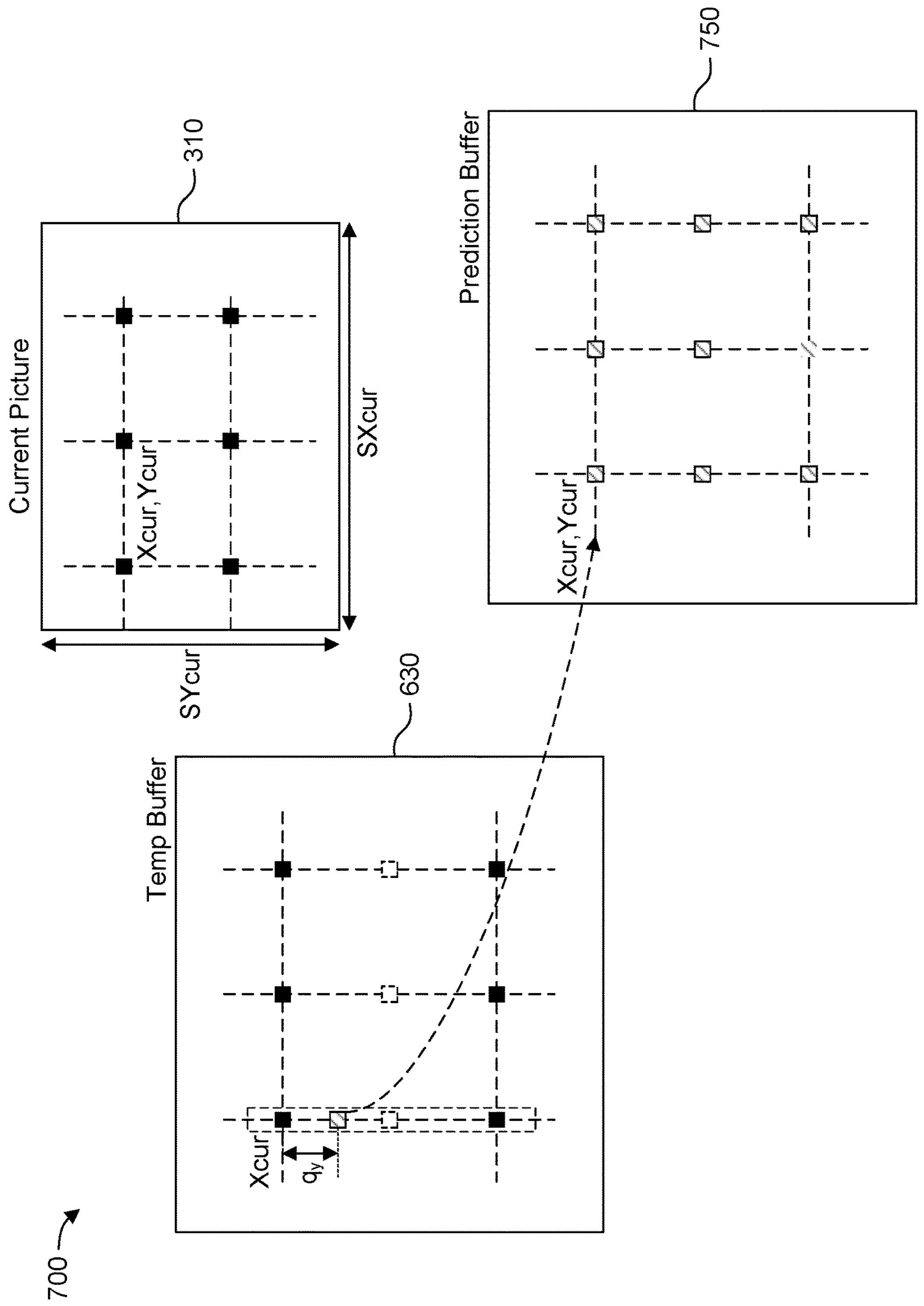
FIG. 7 illustrates a vertical filtering in the two stages motion compensation filtering according to an embodiment of the RPR.

FIG. 7 illustrates a vertical filtering (700) in the two stages motion compensation filtering (500) according to an embodiment of the RPR.

In a preliminary step (not shown on FIG. 5), the "scalingRatio" is determined from the reference index corresponding to the reference picture and its associated size. Then, in a step 510, the values (Xref, Yref) of the corresponding position of a sample in the reference picture 320 is determined from the values (Xcur, Ycur) of the position of a sample in a current picture 310, from the motion vector (MVx, MVy) and from the scaling ratio as indicated in EQ(1). Then, in a step 520, an inter prediction of the sample is obtained from 1D filtering of a horizontal line of samples of the reference picture Xref. Since the motion vectors have sub-pel precision, there are as many 1D filters as number of sub-pel position (phase). FIG. 4 illustrates a 1D filtering (440) in which the coefficients w(i) of the filters are determined as a function of the phase (⊖x). The reconstructed sample "rec" (here the inter prediction) is computed with 1D filtering as:

$$rec = \sum_{i=-N}^{N} w(i) \cdot x(Xref + i) \quad \text{(eq. 2)}$$

In a step 530, the reconstructed sample "rec" is stored into a temporary buffer (630) with the size as the DPB. Then, the same process in applied to the vertical dimension in the steps 540 and 550 where an inter prediction of the sample is obtained from 1D filtering of a vertical line of samples of the reference picture Yref and stored in the temporary buffer.

In the description above, one considered the current picture and the reference picture correspond to the same window. It means that if the motion is zero, then the top left and bottom right samples of the two pictures correspond to the two same scene points. If not the case, one should add an offset window parameter to (Xref, Yref).

VVC further comprises efficient motion compensation tools such as DMVR (Decoder Side Motion Refinement), BDOF (Bi-Direction Optical Flow), PROF (Prediction Refinement with Optical Flow), WRAPMV (WRAPping of Motion Vectors), TMVP (Temporal Motion Vector Prediction), SbTMVP (Sub-block based Temporal Motion Vector Prediction). However, some tools are disabled when the frame resolution changes, lowering the compression gains. Thus, if RPR is used to optimize the rate/quality/complexity tradeoffs by changing the resolutions, limiting the use of some tools when the reference picture and the current picture are not at the same spatial resolution (DMVR, BIO, PROF, WRAPMV, TMVP, SbTMVP) underperforms in terms of rate-distortion.

Besides with RPR, the frame resolution changes are usually visible, going from a full resolution frame with some visual artifacts to a blurrier frame with less visual artifact.

Therefore, an alternative solution to RPR is desirable to achieve low bit rate.

This is solved and addressed by the general aspects described herein, which are directed to an encoding and a decoding method wherein a flag specifying to adapt the encoding/decoding in order to emulate a reduced resolution is applied to the part of the picture.

The present principles rely on emulating the use of the RPR tool, i.e. decrease the resolution of information related to the frame, while keeping the same resolution in the encoder or decoder. Accordingly, some syntax elements are disclosed that indicate an emulation of the RPR to the decoder and both some encoding/decoding tools and some syntax elements are adapted to the scaling ratio applied to the frame in a RPR emulation. According to non-limiting examples, the following adaptation are disclosed in the following:

Adaptation of the transforms including zero-out, secondary-transform;

Motion vector resolution adaptation;

Maximum CTU size adaptation, minimum CU size adaptation;

Size adaptation of post-filters processing.

The present principles allow to benefit from frame resolution changes (decrease the amount of information to encode, decrease the syntax overhead), but without decreasing the performance gains because all tools can still be used. Moreover, the visual quality is more stable as no resolution changes are performed.

Figure 8:
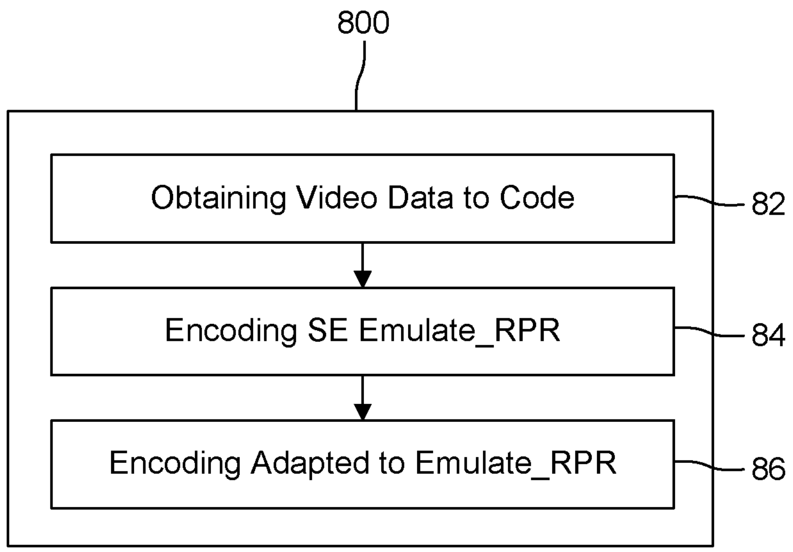
FIG. 8 illustrates a generic encoding method according to a general aspect of at least one embodiment.

FIG. 8 illustrates a generic encoding method (800) according to a general aspect of at least one embodiment. The block diagram of FIG. 8 partially represents modules of an encoder or encoding method, for instance implemented in the exemplary encoder of FIG. 15. In a first step 82, video data representative of a part of a picture to code are obtained. In a second step 84, the emulated use of a reduced resolution for the part of the picture is selected by the encoder and a corresponding syntax element specifying to adapt the encoding in order to emulate a reduced resolution applied to the part of the picture is encoded in the bitstream. In a step 86, video data is encoded wherein at least one process of the encoding is adapted in order to emulate a reduced resolution. Various embodiments are described hereafter with regards to the modified encoding process, such embodiments comprising for instance transform, a motion compensation (where the motion vector resolution is modified), partitioning (with maximum/minimum coding unit size setting), post-filtering as non-limiting examples. Advantageously, in the RPR emulation, less data is coded while the resolution of the original video data and a resolution of the coded video data are equal.

Figure 9:
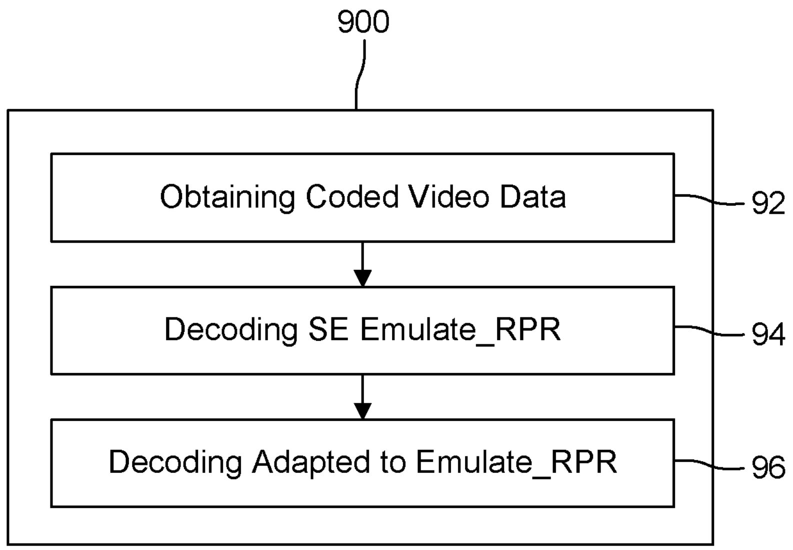
FIG. 9 illustrates a generic decoding method according to a general aspect of at least one embodiment.

FIG. 9 illustrates a generic decoding method (900) according to a general aspect of at least one embodiment. The block diagram of FIG. 9 partially represents modules of a decoder or decoding method, for instance implemented in the exemplary decoder of FIG. 16. The reverse process to the encoding process is performed. In a first step 92, coded video data representative of a part of a picture are obtained. In a second step 94, at least one syntax element specifying to adapt the decoding in order to emulate a reduced resolution is applied to the part of the picture. In a step 86, coded video data is decoded wherein at least one process of the decoding is adapted in order to emulate a reduced resolution. As for encoding process, various embodiments are described hereafter with regards to the modified decoding process, such embodiments comprising for instance transform, a motion compensation (where the motion vector resolution is modified), partitioning (with maximum/minimum coding unit size setting), post-filtering as non-limiting examples.

Various Embodiments of the Generic Encoding or Decoding Method are Described in the Following.

The RPR tool, for instance disclosed in VVC, is used to switch from a resolution to another one. In the remaining of the description, for the sake of simplicity, we will assume the scaling ratio to be half of the original resolution in both directions. However, the present principles are not limited to a scaling ratio of a half and may be extended to any other scaling ratio values.

Figure 10:
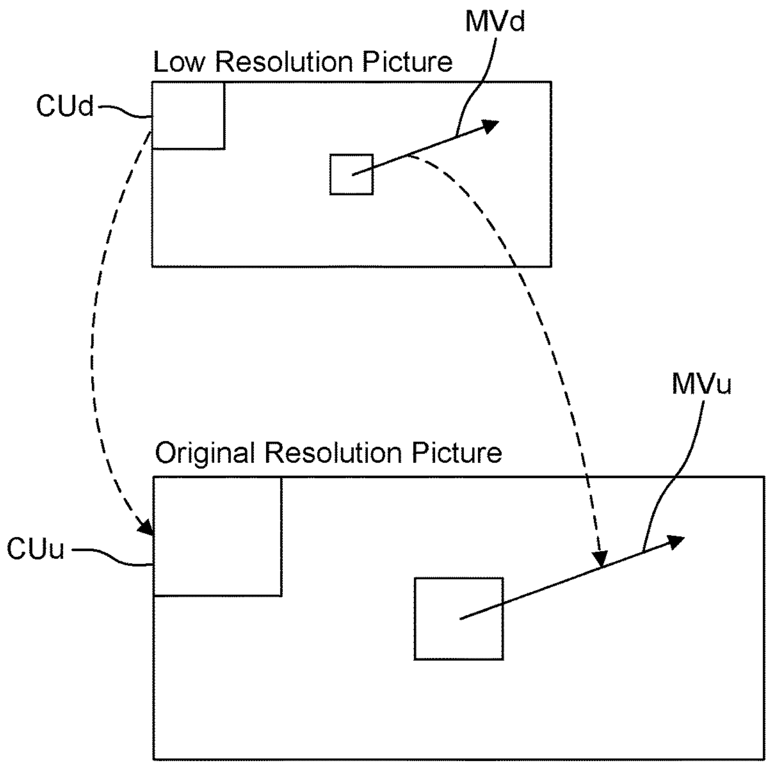
FIG. 10 illustrates the projection of a half resolution coded frame in the original resolution.

FIG. 10 illustrates the projection of a half resolution coded frame in the original resolution according to an embodiment. In FIG. 10 we show, for example, two effects of the ½ resolution coding of a frame:

- A given CU (CUd) in the ½ resolution is equivalent to the same CU (CUu) encoded at the double size but without the high frequency originally contained in the CU.
- A motion vector encoded a given resolution in the ½ resolution frame (for example ¼ pixel resolution MVd) has double the resolution in the original frame (i.e. ½ pixel resolution MVu).

The present principles will emulate such effects of ½ resolution coding of a frame without scaling the coded frame. Thus, according to an embodiment, at least one syntax element is signaled from the encoder to the decoder wherein the at least one syntax data element specifies to adapt the decoding to emulate a reduced resolution applied to a part of the frame. For instance, a slice or picture level flag called emulated_rpr is encoded. The flag equal to true means that the frame is encoded without resolution change, but some tools will be adapted to act "as-if" the resolution was changed.

According to a first embodiment, the emulated resolution of the frame is signaled from an encoder to a decoder.

According to a variant of the first embodiment, at least one syntax element is further signaled from the encoder to the decoder, wherein the at least one syntax data element specifies the emulated resolution of the frame, such as a downscale value for the emulated resolution. When emulated_rpr is true, an additional parameter giving the emulated resolution of the frame is also encoded, for example emulated_rpr_downscale_log2_minus1 as shown in the table below:

| emulated_rpr_downscale_log2_minus1 | Emulated downscale |
|---|---|
| 0 | ½ resolution |
| 1 | ¼ resolution |

Alternatively, the resolution of the emulated downscaled frame for vertical and horizontal direction can be different as in default RPR mode using emulated_rpr_downscale_log2_minus1_x and
emulated_rpr_downscale_log2_minus1_y.

In yet another variant, other values of downscaling factors are compatible with the present principles and signaled.

According to another variant of the first embodiment, the resolution of the emulated downscaled frame is signaled as in default RPR mode. For the sake of completeness, the PPS syntax is specified in VVC (in section 7.3.2.5 Picture parameter set RBSP syntax) as follow:

| | Descriptor |
|---|---|
| pic_parameter_set_rbsp( ) { | |
| pps_pic_parameter_set_id | u(6) |
| pps_seq_parameter_set_id | u(4) |
| pps_mixed_nalu_types_in_pic_flag | u(1) |
| pps_pic_width_in_luma_samples | ue(v) |
| pps_pic_height_in_luma_samples | ue(v) |

When RPR is in used, pps_pic_width_in_luma_samples and pps_pic_height_in_luma_samples are less than the sps_pic_width_max_in_luma_samples and sps_pic_height_max_in_luma_samples signaled in the SPS (see section 7.3.2.4 Sequence parameter set RBSP syntax). The semantics of VVC is as follow in section 7.4.3.5 Picture parameter set RBSP semantics:

pps_pic_width_in_luma_samples specifies the width of each decoded picture referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples.

When sps_res_change_in_clvs_allowed_flag equal to 0, the value of pps_pic_width_in_luma_samples shall be equal to sps_pic_width_max_in_luma_samples.

When sps_ref_wraparound_enabled_flag is equal to 1, the value of (CtbSizeY/MinCbSizeY+1) shall be less than or equal to the value of (pps_pic_width_in_luma_samples/MinCbSize−1).

pps_pic_height_in_luma_samples specifies the height of each decoded picture referring to the PPS in units of luma samples. pps_pic_height_in_luma_samples shall not be equal to 0 and shall be an integer multiple of Max(8, MinCbSizeY), and shall be less than or equal to sps_pic_height_max_in_luma_samples.

When sps_res_change_in_clvs_allowed_flag equal to 0, the value of pps_pic_height_in_luma_samples shall be equal to sps_pic_height_max_in_luma_samples.

Thus, according to this variant of the first embodiment, the PPS syntax is modified to implicitly signal the resolution by using the existing signaling in combination with the flag emulated_rpr. For instance, the syntax in the PPS is changed as follow (changes are underlined):

| | Descriptor |
|---|---|
| pic_parameter_set_rbsp( ) { | |
| pps_pic_parameter_set_id | u(6) |
| pps_seq_parameter_set_id | u(4) |
| pps_mixed_nalu_types_in_pic_flag | u(1) |
| pps_emulated_rpr | u(1) |
| pps_pic_width_in_luma_samples | ue(v) |
| pps_pic_height_in_luma_samples | ue(v) |

And the semantics as follow:

pps_pic_width_in_luma_samples specifies the width of each decoded picture when emulated_rpr is equal to 0 referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples. When emulated_rpr is equal to 1, pps_pic_width_in_luma_samples specifies the width of an emulated picture but the real frame width is given by sps_pic_width_max_in_luma_samples.

The same applies for pps_pic_height_in_luma_samples.

In all other places, pps_pic_width_in_luma_samples is replaced by sps_pic_width_max_in_luma_samples when pps_emulated_rpr is equal to 1.

We then deduced the following values:

log2emulatedXscale=log2(sps_pic_width_max_in_luma_samples/pps_pic_width_in_luma_samples)

log2emulatedYscale=log2(sps_pic_height_max_in_luma_samples/pps_pic_height_in_luma_samples)

where log2emulatedScale=min(log2emulatedXscale, log2emulatedYscale)

According to another variant of the first embodiment, the PPS syntax is modified to explicitly signal the resolution by using the new signaling in combination with the flag emulated_rpr. For instance, the syntax in the PPS is changed as follow (changes are underlined):

| | Descriptor |
|---|---|
| pic_parameter_set_rbsp( ) { | |
| pps_pic_parameter_set_id | u(6) |
| pps_seq_parameter_set_id | u(4) |
| pps_mixed_nalu_types_in_pic_flag | u(1) |
| pps emulated rpr | u(1) |
| if (pps emulated rpr) | |
| pps pic emulated width in luma samples | ue(v) |
| pps pic emulated width in luma samples | ue(v) |
| pps_pic_width_in_luma_samples | ue(v) |
| pps_pic_height_in_luma_samples | ue(v) |

In this case, the emulated size is explicitly signaled and pps_pic_width_in_luma_samples and pps_pic_height_in_luma_samples are used the same way as before.

According to a second embodiment, the forward transform process of the encoding or the backward transform process of the decoding is adapted to emulate a reduced resolution applied to said part of the picture.

Figure 11:
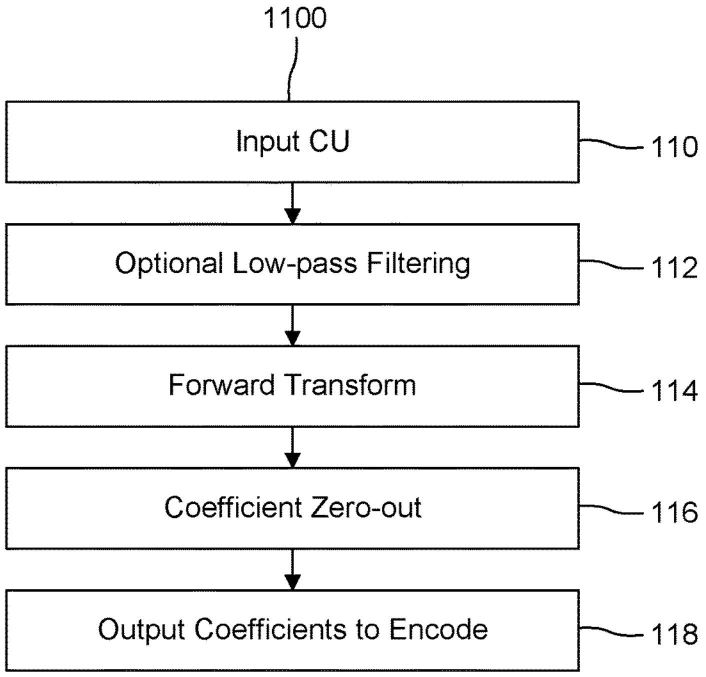
FIG. 11 illustrates a transform process adapted to emulating RPR according to a general aspect of at least one embodiment.

FIG. 11 illustrates a transform process adapted to emulating RPR according to a general aspect of at least one embodiment.

In a first step 110, an input CU to which emulated RPR is to be applied is obtained.

According to a variant of the second embodiment, the primary transform is modified and uses a low-pass filter for instance cutting half the frequencies of the input CU. For example, a low-pass filter is first applied in the spatial domain on the original frame and used to compute the residual to encode. Thus, in a second optional step 112, a low pass filtering is applied to the samples of the input CU (i.e. residuals to transform). Indeed, in order to emulate the loss of the high frequencies in the RPR frame, on encoder side, a given CU is filtered using a low-pass filter, typically cutting half the frequencies. This filtering is done at encoder side and reduce the rate by removing the high frequencies coefficients.

Then, in a step 116, the forward transform is performed.

According to another variant of the second embodiment, the maximum number of non-zero coefficients is reduced and derived from the emulated RPR size. Advantageously, in order to further improve the coding efficiency, the maximum number of non-zero coefficients can be deduced from the emulated RPR size:

If the emulated resolution is ½, then only the top quarter of the transformed coefficients are deduced to be possibly non-zero (other coefficients are zero-out after the forward transform). In this case, the last_sig_coeff is adapted.

For example, VVC (Section 7.3.11.11 Residual coding syntax) specifies the following syntax for residual coding:

| | Descriptor |
|---|---|
| residual_coding( x0, y0, log2TbWidth, log2TbHeight, cIdx ) { | |
| if( sps_mts_enabled_flag && cu_sbt_flag && cIdx = = 0 && log2TbWidth = = 5 && log2TbHeight < 6 ) | |
| log2ZoTbWidth = 4 | |
| else | |
| log2ZoTbWidth = Min( log2TbWidth, 5 ) | |
| if( sps_mts_enabled_flag && cu_sbt_flag && cIdx = = 0 && log2TbWidth < 6 && log2TbHeight = = 5 ) | |
| log2ZoTbHeight = 4 | |
| else | |
| log2ZoTbHeight = Min( log2TbHeight, 5 ) | |

Where log2ZoTbWidth (respectively log2ZoTbHeight) defines the width (respectively height) of the coded transform block size.

In emulated RPR mode, the following changes are applied

```
if( emulated rpr )
    log2ZoTbWidth = log2ZoTbWidth−log2emulatedXscale
    log2ZoTbHeight = log2ZoTbWidth−log2emulatedYscale
```

In a step 116, the high frequencies coefficients are zeroed out according to the values of log2ZoTbWidth and log2ZoTbHeight described above. As an example, for a 32×32 transform block, coded in emulated_rpr mode with ½ of the original resolution in both X and Y direction, log2ZoTbWidth and log2ZoTbHeight were equal to 5 (when no sbt mode was used) and are equal to 4 with the emulated RPR mode.

In VVC, the maximum log2ZoTbWidth and log2ZoTbHeight is 5, i.e. for block larger than 32×32, the coefficients outside the top-left part are zero-out. According to yet another variant, the emulate rpr adaptation is done before the adaptation to the maximum transform block size and the residual_coding syntax is modified as follows (underlined changes):

| | Descriptor |
|---|---|
| residual_coding( x0, y0, log2TbWidth, log2TbHeight, cIdx ) { | |
| if( sps_mts_enabled_flag && cu_sbt_flag && cIdx = = 0 && log2TbWidth = = 5 && log2TbHeight < 6 ) | |
| log2ZoTbWidth = 4 | |
| else | |
| log2ZoTbWidth = log2ZoTbWidth−log2emulatedXscale | |
| log2ZoTbWidth = Min( log2ZoTbWidth, 5 ) | |
| if( sps_mts_enabled_flag && cu_sbt_flag && cIdx = = 0 && log2TbWidth < 6 && log2TbHeight = = 5 ) | |
| log2ZoTbHeight = 4 | |
| else | |
| log2ZoTbHeight = log2ZoTbWidth−log2emulatedYscale | |
| log2ZoTbHeight = Min( log2ZoTbHeight, 5 ) | |

Finally in a step 118, the transformed coefficients are output and provided to the entropy coder.

According to another variant of the second embodiment, the size of other types of transforms is adapted to emulate RPR.

In a variant, the minimum transform size (MinTbSizeY) is typically multiplied by the down-scaling ratio being emulated while coding/decoding a picture with the present principles. For instance, in case of an emulated down-scaling ratio equal to 2, the variable MinTbLog2SizeY is fixed to 3 instead of 2 as in VVC specification, leading to a minimum transform block size equal to 8 in luma samples.

Furthermore, with regards to maximum allowed transform size, the use of alternative transforms to DCT2, through the MTS (Multiple Transform Set) coding tool, is allowed for CU size at most equal to 32 in width and height, according to VVC specification. In the present variant, the maximum CU size for which MTS is allowed is automatically adapted according to the spatial picture scaling ratio being emulated during the coding/decoding of a given picture. For instance, in the case of a down-scaling ratio be equal to 2, this takes the form of normatively enabling MTS up to CU size 64 in width or height.

According to another variant of the second embodiment, the size of secondary transforms is adapted to emulate RPR.

In VVC, a secondary transform called LFNST, Low-Frequency Non-Separable Transform (as specified in section 8.7.4 Transformation process for scaled transform coefficients) is performed.

The parameter nonZeroSize is defined as:

nonZeroSize = ( ( nTbW = = 4 && nTbH = = 4 ) | |
( nTbW = = 8 && nTbH = = 8 ) ) ? 8 : 16

According to another variant, RPR is emulated with the secondary transform (LFNST) instead of the primary transform. With the same analogy as for primary transform, half of the transform coefficients are retained to emulate resolution change with RPR. Specifically, the nonZeroSize is modified as follows:

nonZeroSize = ( ( nTbW = = 4 && nTbH = = 4 ) | |
( nTbW = = 8 && nTbH = = 8 ) ) ? ~~8~~4 : ~~16~~8

The coding of LFNST index is also modified according to the change with zero-out size. Currently, LFNST index is coded if a variable "LfnstZeroOutSigCoeffFlag" is equal to zero:

| | |
|---|---|
| if( ( IntraSubPartitionsSplitType != ISP_NO_SPLIT \| \| LfnstDcOnly = = 0 ) && LfnstZeroOutSigCoeffFlag = = 1 ) | |
| lfnst_idx | ae(v) |

This variable depends on the position of the last coefficient in the TU:

If( ( lastSubBlock > 0 && log2TbWidth >= 2 &&
log2TbHeight >= 2 ) | |
( lastScanPos > 7 && ( log2TbWidth = = 2 | |
log2TbWidth = = 3 )
&&
log2TbWidth = = log2TbHeight ) )
LfnstZeroOutSigCoeffFlag = 0

That is, if the last coefficient is located outside the first 4×4 coefficient (log2TbWidth>=2 && log2TbHeight>=2) for TU sizes not equal to 4×4 or 8×8, LfnstZeroOutSigCoeffFlag is set to zero. Otherwise, if TU size is either 4×4 or 8×8, then if there are more than 8 coefficients (lastScanPos>7), LfnstZeroOutSigCoeffFlag is set to zero as well.

According to a variant, TU syntax table is modified to emulate RPR as shown below:

If( ( lastSubBlock > 0 && ~~log2TbWidth >= 2 &&~~
~~log2TbHeight >= 2~~
lastScanPos > 7) | |
( lastScanPos > ~~7~~ 3 && ( log2TbWidth = = 2 | |
log2TbWidth = = 3 ) &&
log2TbWidth = = log2TbHeight ) )
LfnstZeroOutSigCoeffFlag = 0

That is, if there are more than 8 coefficient for all TU sizes (except 4×4 and 8×8), or more than 4 coefficients for 8×8 or 4×4 Tus, LfnstZeroOutSigCoeffFlag is set to zero as well.

According to a third embodiment, the resolution of the motion vectors used in motion compensation in the encoding or in the decoding is adapted to emulate a reduced resolution applied to said part of the picture.

In VVC, default resolution for motion vector residual in AMVP is set to ¼ pixel resolution. A tool called AMVR (see section 7.4.12.5 Coding unit semantics) is used to specify the resolution of motion vector as described with the following variables:

amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_idx[x0][y0].

amvr_precision_idx[x0][y0] specifies that the resolution of the motion vector difference with AmvrShift is defined in Table 16. The array indices x0, y0 specify the location (x0, y0) of the top-left luma sample of the considered coding block relative to the top-left luma sample of the picture.

For each of these values in the SPS, the value is adapted to act "as-if" the frame was coded with a downscaled resolution.

According to a variant the maximum CU size is adapted. For example, for an emulated RPR size of ½ of the original frame, the sps_log2_ctu_size_minus5 is increased by 1 compared to the original value.

In another variant, the values in the SPS are coded with the same values, but the semantics is adapted as described below for the exemplary parameter sps_log2_ctu_size_minus5.

Accordingly, in a variant of the fourth embodiment, the maximum CTU size is adapted to emulated RPR. For instance, VVC (section 7.4.3.3 Video parameter set RBSP semantics) defines:

sps_log2_ctu_size_minus5 plus 5 specifies the luma coding tree block size of each CTU. The value of sps_log2_ctu_size_minus5 shall be in the range of 0 to 2, inclusive. The value 3 for sps_log2_ctu_size_minus5 is reserved for future use by ITU-T|ISO/IEC. Decoders conforming to this version of this Specification shall ignore the CLVSs with sps_log2_ctu_size_minus5 equal to 3.

TABLE 16

Specification of AmvrShift

| | | AmvrShift | | |
|---|---|---|---|---|
| amvr_flag | amvr_precision_idx | inter_affine_flag = = 1 | CuPredMode[chType][x0][y0] = = MODE_IBC) | inter_affine_flag = = 0 && CuPredMode[chType][x0][y0] != MODE_IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) |

In the emulated RPR, the Amvr shift is adapted as follow:

AmvrShift=AmvrShift−log2emulatedScale

In a variant wherein X and Y downscaling are different, a different motion vector resolution on X and Y can be used leading to:

AmvrShift_*X*=AmvrShift−log2emulated*X*scale

AmvrShift_*Y*=AmvrShift−log2emulated*Y*scale.

According to a fourth embodiment, the different CU size constraints on the current frame are adapted to emulated RPR. Thus, in order to adapt the size of the different CU size constraints on the current frame, SPS coded values as specified in VVC can be adapted at encoder side, namely, the following parameters are modified for the emulated resolution:

sps_log2_ctu_size_minus5
sps_log2_min_luma_coding_block_size_minus2
sps_log2_diff_min_qt_min_cb_intra_slice_luma
sps_max_mtt_hierarchy_depth_intra_slice_luma
sps_log2_diff_max_bt_min_qt_intra_slice_luma
sps_log2_diff_max_tt_min_qt_intra_slice_luma
sps_log2_diff_min_qt_min_cb_intra_slice_chroma
sps_max_mtt_hierarchy_depth_intra_slice_chroma
sps_log2_diff_max_bt_min_qt_intra_slice_chroma
sps_log2_diff_max_tt_min_qt_intra_slice_chroma
sps_log2_diff_min_qt_min_cb_inter_slice
sps_max_mtt_hierarchy_depth_inter_slice
sps_log2_diff_max_bt_min_qt_inter_slice
sps_log2_diff_max_tt_min_qt_inter_slice The variables CtbLog2SizeY and CtbSizeY are derived as follows:

$$CtbLog2SizeY = \text{sps\_log2\_ctu\_size\_minus5} + 5 \quad (35)$$

$$CtbSizeY = 1 \ll CtbLog2SizeY$$

Wherein the last part of above reproduced section is adapted as follow for emulated RPR: The variables CtbLog2SizeY and CtbSizeY are derived as follows:

$$CtbLog2SizeY = \underline{\min(7, \text{sps\_log2\_ctu\_size\_minus5} + 5 + \log2 emulatedScale)} \quad (35)$$

$$CtbSizeY = 1 \ll CtbLog2SizeY$$

The skilled in the art will note that a compliant encoder will not use value of sps_log2_ctu_size_minus5 such as (sps_log2_ctu_size_minus5+5+log2emulatedScale) is greater than 7.

According to a variant the minimum CU size is adapted. In VVC (7.4.3.3 Video parameter set RBSP semantics) specifies:

sps_log2_min_luma_coding_block_size_minus2 plus 2 specifies the minimum luma coding block size. The value range of sps_log2_min_luma_coding_block_size_minus2 shall be in the range of 0 to Min(4, sps_log2_ctu_size_minus5+3), inclusive.

The variables MinCbLog2SizeY, MinCbSizeY, IbcBufWidthY, IbcBufWidthC and Vsize are derived as follows:

$$MinCbLog2SizeY = \text{sps\_log2\_min\_luma\_coding\_block\_size\_minus2} + 2 \quad (43)$$

$$MinCbSizeY = 1 \ll MinCbLog2SizeY \quad (44)$$

$$IbcBufWidthY = 256 * 128 / CtbSizeY \quad (45)$$

$$IbcBufWidthC = IbcBufWidthY / SubWidthC \quad (46)$$

$$VSize = \text{Min}(64, CtbSizeY) \quad (47)$$

The value of MinCbSizeY shall less than or equal to VSize.

And a part of above reproduced section is adapted as follow for minimum CU size for emulated RPR (underlined):

MinCbLog2Size*Y*=min (sps_log2_min_luma_coding_block_size_minus2+ 2+log2emulatedScale,*T*)

With T=Min(4,sps_log2_ctu_size_minus5+3)+2

The above explicit examples of emulated RPR adaptation of maximum CU size and minimum CU size will be non-ambiguously extended to other SPS values as listed above.

For instance, according to yet another variant of adapted SPS values, the maximum transform size (sps_max_luma_transform_size_64_flag) is typically extended based on the RPR spatial scaling ratio being emulated.

Typically, in VVC the maximum transform size is 64. In the present variant, the maximum transform size is set to 128 in the case of an RPR scaling ratio equal to 2.

With respect to the VVC syntax element signaling, the maximum transform size, (sps_max_luma_transform_size_64_flag) has a semantics that depends on the RPR scaling ratio being emulated in the considered coded picture. If the current picture is coded while emulating a down-scaling by 2 in width and height, then the max_luma_transform_size syntax element indicates whether the maximum transform size is equal to 128 or 64, rather than 64 or 32.

Figure 12:
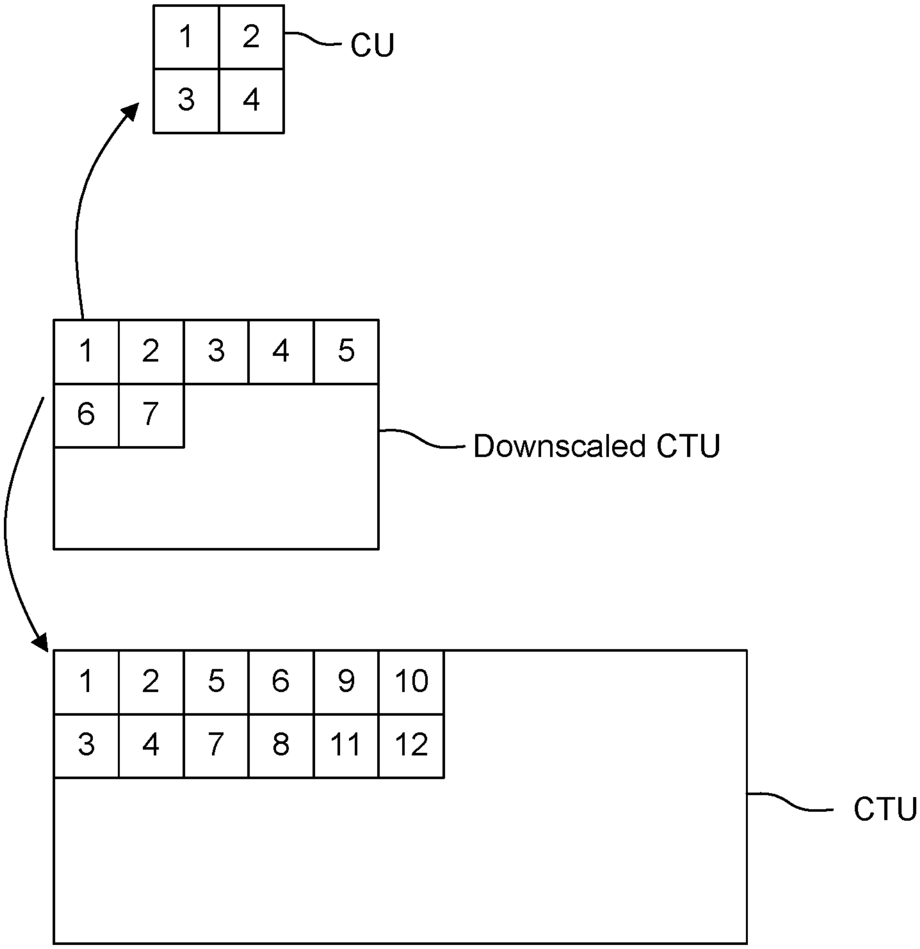
FIGS. 12 and 13 illustrate CU coding order according to a general aspect of at least one embodiment.
Figure 13:
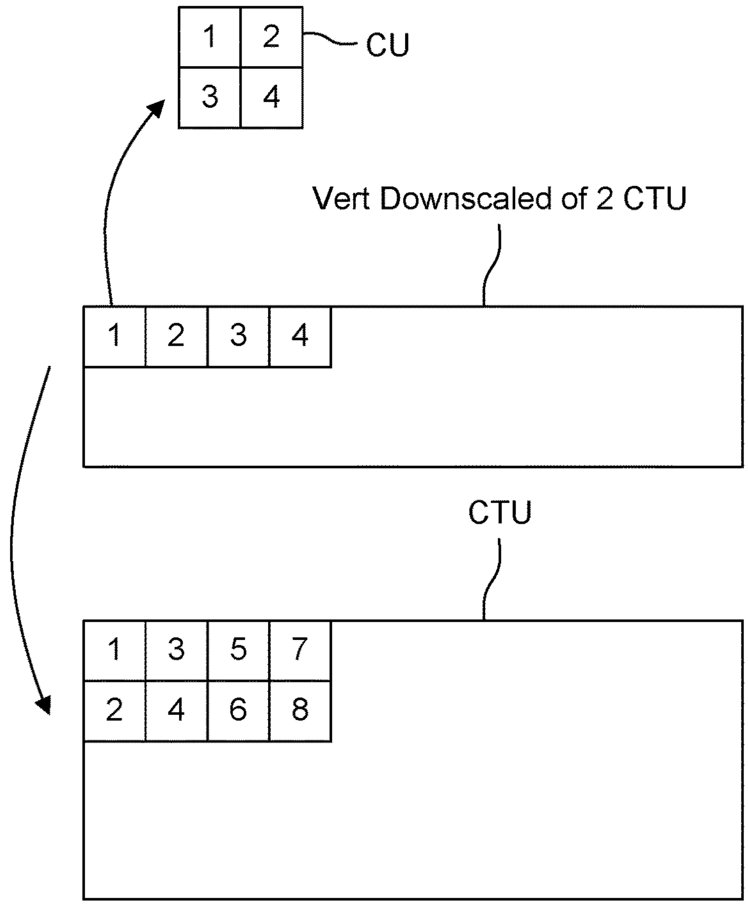

According to a fifth embodiment, the coding order is adapted to emulate the coding order of the CU in the downscaled frame. In case the emulated downscaled frame uses the maximum CTU size (for example 128 samples in VVC), the coding order to emulate the coding order of the CU in the downscaled frame is adapted as described hereafter with FIGS. 12 and 13. FIGS. 12 and 13 illustrate CU coding order according to a general aspect of at least one embodiment. In FIG. 12, the middle figure shows the coding order of the CTU in a frame downscaled by a factor 2. In the top, we show the coding order of the CU inside the CTU for such size. When mapped on the frame at the original resolution, the CTU coding order is changed as depicted on the bottom figure. More specifically, for a CTU size of 128, it means the coding order of the CTU is "as-if" the CTU where part of a larger "virtual" CTU of size 256. The adapted coding order is deduced from the emulated_rpr flag and the values of the X and Y downscale values as shown in FIG. 13. In FIG. 13, we show the resulting coding order for a vertical downscale of 2: the first CTU in the downscaled frame is mapped onto 2 CTU in the original frame which are stacked vertically. In this case the order is adapted as shown on the bottom frame of FIG. 13.

According to a sixth embodiment, the size of the post-filters processing is adapted to emulated RPR. For instance, the signaling of the size of the adaptive loop filter ALF processing is modified as detailed here. In VVC (see section 7.4.12.2 Coding tree unit semantics), all ALF parameters are encoded using the ctb addresses, for example for alf_ctb_flag:

alf_ctb_flag[cIdx][xCtb>>CtbLog2SizeY][yCtb>>CtbLog2SizeY] equal to 1 specifies that the adaptive loop filter is applied to the coding tree block of the colour component indicated by cIdx of the coding tree unit at luma location (xCtb, yCtb).

alf_ctb_flag[cIdx][xCtb>>CtbLog2SizeY][yCtb>>CtbLog2SizeY] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>CtbLog2SizeY][yCtb>>CtbLog2SizeY] is not present, it is inferred to be equal to 0.

In case the CtbLog2SizeY is already set to the maximum allowed (for example 7 in VVC), the constraints can be relaxed for the ALF process in order to adapt to the emulated RPR size. Typically all addressing:

[*x*Ctb>>CtbLog2Size*Y*][*y*Ctb>>CtbLog2Size*Y*]

Are replaced by:

[*x*Ctb>>CtbLog2Size*Y*emulated] [*y*Ctb>>CtbLog2Size*Y*emulated]

With CtbLog2SizeYemulated=CtbLog2SizeY+log2emulatedScale

By doing so, the processing area of ALF is increased by a factor depending of the emulated RPR downscaling ratio.

Advantageously ALF parameters index is adapted the same way, using the CtbLog2SizeYemulated parameters to adapt the granularity.

One drawback of the above method is that it can force to have 256×256 processing area at decoder, which might not be suitable because of some hardware constraints at the decoder. Another way to decrease the syntax without changing the processing area at decoder side is to infer automatically the alf_ctb_flag and alf_luma_prev_filter_idx/alf_luma_fixed_filter_idx/alf_ctb_filter_alt_idx (see 7.4.12.2 Coding tree unit semantics) from the neighboring values.

Figure 14:
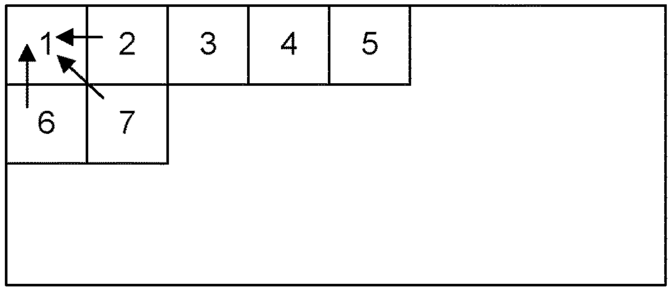
FIG. 14 illustrates the ALF implicit parameters copy according a general aspect of at least one embodiment.

FIG. 14 illustrates the ALF implicit parameters copy according a general aspect of at least one embodiment. Accordingly, as shown on FIG. 14 for an exemplary ratio of ½ emulated RPR:

- The first CTU 1 ALF parameters (flag and index) are decoded normally
- For the second CTU 2 and the CTU 6 (below 1) and 7 (on right of 6), the parameters are not signaled but simply copied from the CTU 1 parameters On encoder side, during the computation of the ALF parameters, the whole area 1/2/6/7 is used in order to compute the relevant ALF parameters.

According to another non-limiting example, the signaling of the SAO parameters filter is modified as detailed here.

In VVC all SAO parameters are encoded per CTB using the CTB addresses (rx=CtbAddrX, ty=CtbAddrY) as shown in the below Table 1 (Section 7.3.10.2 Coding tree unit syntax of VVC).

TABLE 1

| extract of coding tree unit syntax in VVC | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_sao_luma_used_flag \| \| sh_sao_chroma_used_flag ) | |
| sao( CtbAddrX, CtbAddrY ) | |
| ... | |
| } | |

For example SaoTypeIdx[cIdx][rx][ry] is the value of saoTypeIdx for the CTB at position (rx, ry). Similarly, to ALF, the coding of the SAO parameters are done for an area larger than regular CTB size, with values corresponding to CTB area increased by a factor depending of the emulated RPR downscaling ratio.

As for ALF, an implicit merge can be done from CTU to CTU. In this case sao_merge_left_flag is inferred to 1 for CTU 2 and sao_merge_up_flag is inferred to 1 for CTU 6 and 7.

According to a seventh embodiment, the size constraints sued in activating or deactivating tools in an encoding/decoding scheme are adapted to the emulated resolution. Indeed, in VVC, many tools are activated or not depending on size constraints. In a variant of an emulated RPR, these size constraints are adapted.

In case the constraint is a minimum size constraint, the constraint can always be adapted to the emulated RPR frame by multiplying the original size constraint by the (1<<log2emulatedScale) factor (or separately on width and height if needed).

For instance, constraints on the minimum size of a CU, TU or blocks can be adapted by multiplying the constraint by the correct factor, typically:

Width>=*xx* as width>=*xx**(1<<log2emulated*X*Scale)

Height>=*yy* as height>=*yy**(1<<log2emulated*Y*Scale)

For example, in VVC (7.3.10.5 Coding unit syntax), for the minimum size of an affine CU:

```
if( sps_affine_enabled_flag && cbWidth >= 16 &&
cbHeight >= 16 )
{
   inter_affine_flag[ x0 ][ y0 ]                    ae(v)
```

Is adapted as:

```
if( sps_affine_enabled_flag && cbWidth >= 16 *(1<<
log2emulatedXScale) && cbHeight >=
16*(1 << log2emulatedYScale) ) {
   inter_affine_flag[ x0 ][ y0 ]                    ae(v)
```

Or the constraints on size for SBT mode:

```
if( CuPredMode[ chType ][ x0 ][ y0 ] = = MODE_INTER &&
sps_sbt_enabled_flag &&
   !ciip_flag[ x0 ][ y0 ] && cbWidth <= MaxTbSizeY &&
cbHeight <= MaxTbSizeY ) {
   allowSbtVerH = cbWidth >= 8
   allowSbtVerQ = cbWidth >= 16
   allowSbtHorH = cbHeight >= 8
   allowSbtHorQ = cbHeight >= 16
```

Is adapted as:

```
if( CuPredMode[ chType ][ x0 ][ y0 ] = = MODE_INTER &&
sps_sbt_enabled_flag &&
   !ciip_flag[ x0 ][ y0 ] && cbWidth <= MaxTbSizeY &&
cbHeight <= MaxTbSizeY ) {
   allowSbtVerH = cbWidth >= 8*(1 << log2emulatedXScale)
   allowSbtVerQ = cbWidth >= 16*(1 << log2emulatedXScale)
   allowSbtHorH = cbHeight >= 8*(1 << log2emulatedYScale)
   allowSbtHorQ = cbHeight >= 16*(1 << log2emulatedYScale)
```

Sometimes, the constraint is expressed as an equality when the size is equal to the minimum block size (4 in VVC), then the constraint "==4" is replaced by ">=4*(1<<log2emulatedScale)".

For example, in VVC (7.3.10.5 Coding unit syntax), a CU can be coded in inter mode if it is greater than 4×4:

```
                                                          Descriptor
coding_unit( x0, y0, cbWidth, cbHeight, cqtDepth,
treeType, modeType ) {
  if( sh_slice_type = = I && ( cbWidth > 64 | |
  cbHeight > 64 ) )
    modeType = MODE_TYPE_INTRA
  chType = treeType = = DUAL_TREE_CHROMA ?
  1 : 0
  if( sh_slice_type != I | | sps_ibc_enabled_flag ) {
    if( treeType != DUAL_TREE_CHROMA &&
        ( ( !( cbWidth = = 4 && cbHeight = = 4 ) &&
        modeType != MODE_TYPE_INTRA ) | |
        ( sps_ibc_enabled_flag && cbWidth <=
        64 && cbHeight <=
64 ) ) )
      cu_skip_flag[ x0 ][ y0 ]                            ae(v)
```

It is simply adapted as:

```
                                                          Descriptor
coding_unit( x0, y0, cbWidth, cbHeight, cqtDepth,
treeType, modeType ) {
  if( sh_slice_type = = I && ( cbWidth > 64 | |
  cbHeight > 64 ) )
    modeType = MODE_TYPE_INTRA
  chType = treeType = = DUAL_TREE_CHROMA ?
  1 : 0
  if( sh_slice_type != I | | sps_ibc_enabled_flag ) {
    if( treeType != DUAL_TREE_CHROMA &&
        ( ( !( cbWidth <4*(1 << log2emulatedXScale) &&
        cbHeight
<4*(1 << log2emulatedYScale) ) &&
        modeType != MODE_TYPE_INTRA ) | |
        ( sps_ibc_enabled_flag && cbWidth <=
        64 && cbHeight <=
64 ) ) )
      cu_skip_flag[ x0 ][ y0 ]                            ae(v)
```

In case the constraint is a maximum size constraint, the constraint can be relaxed in VVC by adapting the values of some variables linked to the maximum available size. For example, the maximum transform size is controlled by MaxTbSizeY which is controlled by the flag sps_max_luma_transform_size_64_flag (in 7.4.3.4 Sequence parameter set RBSP semantics). In this case, the parameter is sps_max_luma_transform_size_64_flag is inferred to 1 in case the emulated RPR mode is activated and the downscaled is greater or equal to 2. It means that for the current frame, the 64 transform is always available as the 32 transform is always available for the downscaled frame.

ADDITIONAL EMBODIMENTS AND INFORMATION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 15:
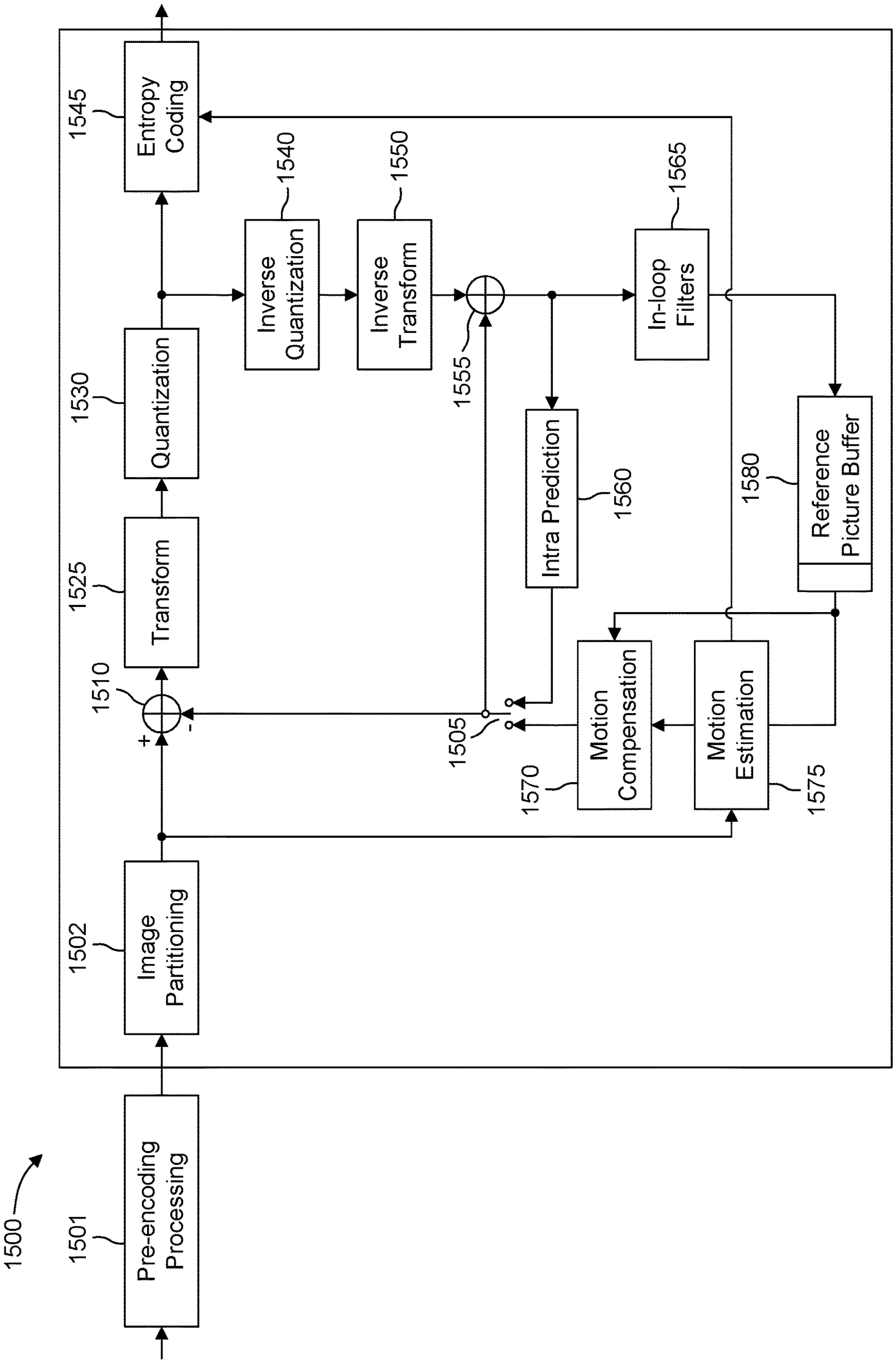
FIG. 15 illustrates a block diagram of an embodiment of video encoder in which various aspects of the embodiments may be implemented.
Figure 16:
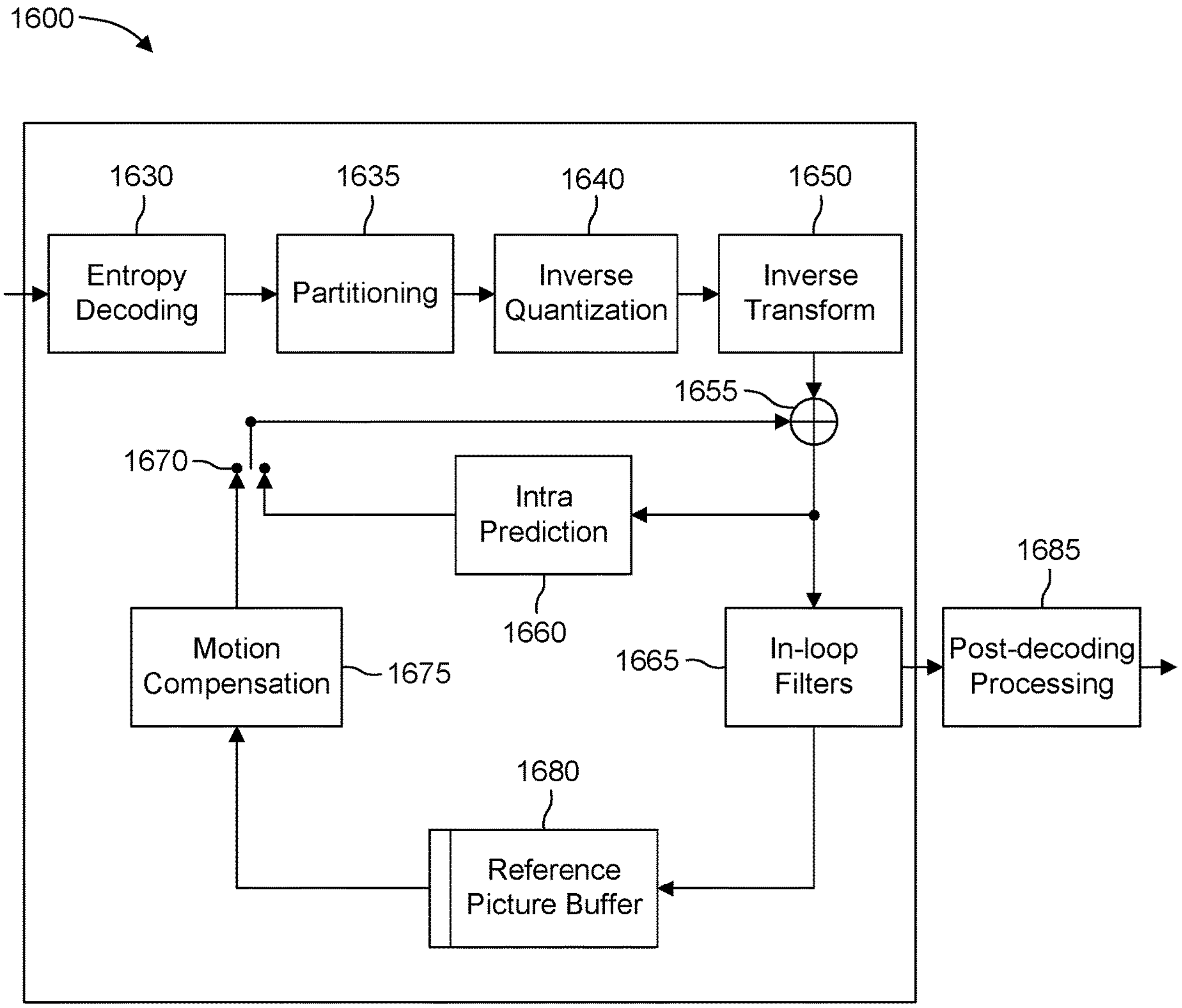
FIG. 16 illustrates a block diagram of an embodiment of video decoder in which various aspects of the embodiments may be implemented.
Figure 17:
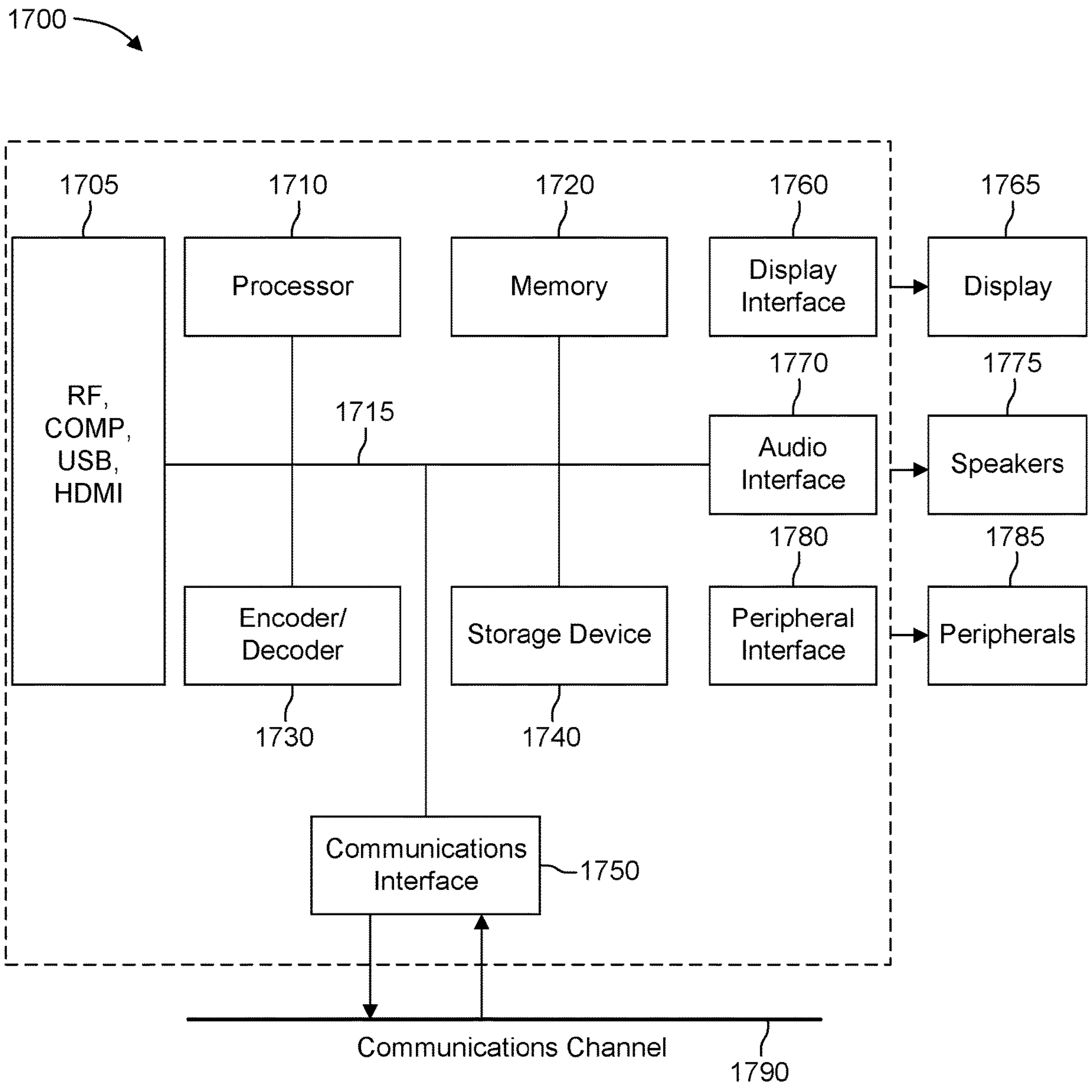
FIG. 17 illustrates a block diagram of an example apparatus in which various aspects of the embodiments may be implemented.

The aspects described and contemplated in this application can be implemented in many different forms. FIG. 15, FIG. 16 and FIG. 17 below provide some embodiments, but other embodiments are contemplated and the discussion of FIG. 15, FIG. 16 and FIG. 17 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the image partitioning, transform modules, and/or inverse transform modules, motion compensation, in-loop filters (1502, 1525, 1550, 1650, 1570, 1675, 1565, 1665), of a video encoder 1500 and decoder 1600 as shown in FIG. 15 and FIG. 16. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of transforms, the number of transform level, the indices of transforms. The specific values are for example purposes and the aspects described are not limited to these specific values.

FIG. 15 illustrates an encoder 1500. Variations of this encoder 1500 are contemplated, but the encoder 1500 is described below for purposes of clarity without describing all expected variations.

Before being encoded, the video sequence may go through pre-encoding processing (1501), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the preprocessing, and attached to the bitstream.

In the encoder 1500, a picture is encoded by the encoder elements as described below. The picture to be encoded is partitioned (1502) and processed in units of, for example, CUs. Each unit is encoded using, for example, either an intra or inter mode. When a unit is encoded in an intra mode, it performs intra prediction (1560). In an inter mode, motion estimation (1575) and compensation (1570) are performed. The encoder decides (1505) which one of the intra mode or inter mode to use for encoding the unit, and indicates the intra/inter decision by, for example, a prediction mode flag. Prediction residuals are calculated, for example, by subtracting (1510) the predicted block from the original image block.

The prediction residuals are then transformed (1525) and quantized (1530). The quantized transform coefficients, as well as motion vectors and other syntax elements, are entropy coded (1545) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (1540) and inverse transformed (1550) to decode prediction residuals. Combining (1555) the decoded prediction residuals and the predicted block, an image block is reconstructed. In-loop filters (1565) are applied to the reconstructed picture to perform, for example, deblocking/SAO (Sample Adaptive Offset) filtering to reduce encoding artifacts. The filtered image is stored at a reference picture buffer (1580).

FIG. 5 illustrates a block diagram of a video decoder 1600. In the decoder 1600, a bitstream is decoded by the decoder elements as described below. Video decoder 1600 generally performs a decoding pass reciprocal to the encoding pass as described in FIG. 5. The encoder 1500 also generally performs video decoding as part of encoding video data.

In particular, the input of the decoder includes a video bitstream, which can be generated by video encoder 1500. The bitstream is first entropy decoded (1630) to obtain transform coefficients, motion vectors, and other coded information. The picture partition information indicates how the picture is partitioned. The decoder may therefore divide (1635) the picture according to the decoded picture partitioning information. The transform coefficients are de-quantized (1640) and inverse transformed (1650) to decode the prediction residuals. Combining (1655) the decoded prediction residuals and the predicted block, an image block is reconstructed. The predicted block can be obtained (1670) from intra prediction (1660) or motion-compensated prediction (i.e., inter prediction) (1675). In-loop filters (1665) are applied to the reconstructed image. The filtered image is stored at a reference picture buffer (1680). The decoded picture can further go through post-decoding processing (1685), for example, an inverse color transform (e.g. conversion from YCbCr 4:2:0 to RGB 4:4:4) or an inverse remapping performing the inverse of the remapping process performed in the pre-encoding processing (1501). The post-decoding processing can use metadata derived in the pre-encoding processing and signaled in the bitstream.

FIG. 17 illustrates a block diagram of an example of a system in which various aspects and embodiments are implemented. System 1700 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1700, singly or in combination, can be embodied in a single integrated circuit (IC), multiple ICs, and/or discrete components. For example, in at least one embodiment, the processing and encoder/decoder elements of system 1700 are distributed across multiple ICs and/or discrete components. In various embodiments, the system 1700 is communicatively coupled to one or more other systems, or other electronic devices, via, for example, a communications bus or through dedicated input and/or output ports. In various embodiments, the system 1700 is configured to implement one or more of the aspects described in this document.

The system 1700 includes at least one processor 1710 configured to execute instructions loaded therein for implementing, for example, the various aspects described in this document. Processor 1710 can include embedded memory, input output interface, and various other circuitries as known in the art. The system 1700 includes at least one memory 1720 (e.g., a volatile memory device, and/or a non-volatile memory device). System 1700 includes a storage device 1740, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1740 can include an internal storage device, an attached storage device (including detachable and non-detachable storage devices), and/or a network accessible storage device, as non-limiting examples.

System 1700 includes an encoder/decoder module 1730 configured, for example, to process data to provide an encoded video or decoded video, and the encoder/decoder module 1730 can include its own processor and memory. The encoder/decoder module 1730 represents module(s) that can be included in a device to perform the encoding and/or decoding functions. As is known, a device can include one or both of the encoding and decoding modules. Additionally, encoder/decoder module 1730 can be implemented as a separate element of system 1700 or can be incorporated within processor 1710 as a combination of hardware and software as known to those skilled in the art.

Program code to be loaded onto processor 1710 or encoder/decoder 1730 to perform the various aspects described in this document can be stored in storage device 1740 and subsequently loaded onto memory 1720 for execution by processor 1710. In accordance with various embodiments, one or more of processor 1710, memory 1720, storage device 1740, and encoder/decoder module 1730 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1710 and/or the encoder/decoder module 1730 is used to store instructions and to provide working memory for processing that is needed during encoding or decoding. In other embodiments, however, a memory external to the processing device (for example, the processing device can be either the processor 1710 or the encoder/decoder module 1730) is used for one or more of these functions. The external memory can be the memory 1720 and/or the storage device 1740, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1700 can be provided through various input devices as indicated in block 1705. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 6, include composite video.

In various embodiments, the input devices of block 1705 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1700 to other electronic devices across USB and/or HDMI connections. It is to be understood that various aspects of input processing, for example, Reed-Solomon error correction, can be implemented, for example, within a separate input processing IC or within processor 1710 as necessary. Similarly, aspects of USB or HDMI interface processing can be implemented within separate interface ICs or within processor 1710 as necessary. The demodulated, error corrected, and demultiplexed stream is provided to various processing elements, including, for example, processor 1710, and encoder/decoder 1730 operating in combination with the memory and storage elements to process the data stream as necessary for presentation on an output device.

Various elements of system 1700 can be provided within an integrated housing, Within the integrated housing, the various elements can be interconnected and transmit data therebetween using suitable connection arrangement 1715, for example, an internal bus as known in the art, including the Inter-IC (I2C) bus, wiring, and printed circuit boards.

The system 2000 includes communication interface 1750 that enables communication with other devices via communication channel 1790. The communication interface 1750 can include, but is not limited to, a transceiver configured to transmit and to receive data over communication channel 1790. The communication interface 1750 can include, but is not limited to, a modem or network card and the communication channel 1790 can be implemented, for example, within a wired and/or a wireless medium.

Data is streamed, or otherwise provided, to the system 1700, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1790 and the communications interface 1750 which are adapted for Wi-Fi communications. The communications channel 1790 of these embodiments is typically connected to an access point or router that provides access to external networks including the Internet for allowing streaming applications and other over-the-top communications. Other embodiments provide streamed data to the system 1700 using a set-top box that delivers the data over the HDMI connection of the input block 1705. Still other embodiments provide streamed data to the system 1700 using the RF connection of the input block 1705. As indicated above, various embodiments provide data in a non-streaming manner. Additionally, various embodiments use wireless networks other than Wi-Fi, for example a cellular network or a Bluetooth network.

The system 1700 can provide an output signal to various output devices, including a display 1765, speakers 1775, and other peripheral devices 1785. The display 1765 of various embodiments includes one or more of, for example, a touchscreen display, an organic light-emitting diode (OLED) display, a curved display, and/or a foldable display. The display 1765 can be for a television, a tablet, a laptop, a cell phone (mobile phone), or other device. The display 1765 can also be integrated with other components (for example, as in a smart phone), or separate (for example, an external monitor for a laptop). The other peripheral devices 1785 include, in various examples of embodiments, one or more of a stand-alone digital video disc (or digital versatile disc) (DVR, for both terms), a disk player, a stereo system, and/or a lighting system. Various embodiments use one or more peripheral devices 1785 that provide a function based on the output of the system 1700. For example, a disk player performs the function of playing the output of the system 1700.

In various embodiments, control signals are communicated between the system 1700 and the display 1765, speakers 1775, or other peripheral devices 1785 using signaling such as AV.Link, Consumer Electronics Control (CEC), or other communications protocols that enable device-to-device control with or without user intervention. The output devices can be communicatively coupled to system 1700 via dedicated connections through respective interfaces 1765, 1775, and 1785. Alternatively, the output devices can be connected to system 1700 using the communications channel 1790 via the communications interface 1750. The display 1765 and speakers 1775 can be integrated in a single unit with the other components of system 1700 in an electronic device such as, for example, a television. In various embodiments, the display interface 1765 includes a display driver, such as, for example, a timing controller (T Con) chip.

The display 1765 and speaker 1775 can alternatively be separate from one or more of the other components, for example, if the RF portion of input 1705 is part of a separate set-top box. In various embodiments in which the display 1765 and speakers 1775 are external components, the output signal can be provided via dedicated output connections, including, for example, HDMI ports, USB ports, or COMP outputs.

The embodiments can be carried out by computer software implemented by the processor 1710 or by hardware, or by a combination of hardware and software. As a non-limiting example, the embodiments can be implemented by one or more integrated circuits. The memory 1720 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1710 can be of any type appropriate to the technical environment, and can encompass one or more of microprocessors, general purpose computers, special purpose computers, digital signal processors (DSPs), and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, comprising emulating a reduced resolution of at least a part of the picture.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, emulating a reduced resolution of at least a part of the picture.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, emulated_rpr, emulated_rpr_downscale_log2_minus1 are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

- SDP (session description protocol), a format for describing multimedia communication sessions for the purposes of session announcement and session invitation, for example as described in RFCs and used in conjunction with RTP (Real-time Transport Protocol) transmission;
- DASH MPD (Media Presentation Description) Descriptors, for example as used in DASH and transmitted over HTTP, a Descriptor is associated to a Representation or collection of Representations to provide additional characteristic to the content Representation;
- RTP header extensions, for example as used during RTP streaming;
- ISO Base Media File Format, for example as used in OMAF and using boxes which are object-oriented building blocks defined by a unique type identifier and length also known as 'atoms' in some specifications;
- HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for emulating RPR. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

- Adapting at least one process to emulated RPR in the decoder and/or encoder.
- Selecting emulated RPR flag to apply in the decoder and/or encoder.
- Signaling an information relative to emulating RPR process to apply in the decoder.
- Deriving an information relative to an emulated RPR process to apply from RPR parameters, the deriving being applied in the decoder and/or encoder.
- Inserting in the signaling syntax elements that enable the decoder to identify the emulation adapted process to use, such as transform indices.
- Selecting, based on these syntax elements, the at least one process to adapt at the decoder.
- A bitstream or signal that includes one or more of the described syntax elements, or variations thereof.
- A bitstream or signal that includes syntax conveying information generated according to any of the embodiments described.
- Inserting in the signaling syntax elements that enable the decoder to emulated RPR process in a manner corresponding to that used by an encoder.
- Creating and/or transmitting and/or receiving and/or decoding a bitstream or signal that includes one or more of the described syntax elements, or variations thereof.
- Creating and/or transmitting and/or receiving and/or decoding according to any of the embodiments described.
- A method, process, apparatus, medium storing instructions, medium storing data, or signal according to any of the embodiments described.
- A TV, set-top box, cell phone, tablet, or other electronic device that performs a process adapted to emulated RPR according to any of the embodiments described.
- A TV, set-top box, cell phone, tablet, or other electronic device that performs a process adapted to emulated RPR according to any of the embodiments described, and that displays (e.g. using a monitor, screen, or other type of display) a resulting image.
- A TV, set-top box, cell phone, tablet, or other electronic device that selects (e.g. using a tuner) a channel to receive a signal including an encoded image, and performs a process adapted to emulated RPR according to any of the embodiments described.
- A TV, set-top box, cell phone, tablet, or other electronic device that receives (e.g. using an antenna) a signal over the air that includes an encoded image, and performs a process adapted to emulated RPR according to any of the embodiments described.

The invention claimed is:

1. A method for video decoding, the method comprising:
obtaining video data representative of a part of a picture;
decoding, with a resolution that is constant, at least one syntax data element, wherein the at least one syntax data element specifies adapting a set of coding tools to behave as if the resolution were reduced without using reference picture resampling (RPR); and
decoding, with the resolution that is constant, the video data using the set of coding tools.

2. The method of claim 1, wherein the set of coding tools comprises two or more decoding tools.

3. The method of claim 1, wherein the set of coding tools comprises a transform, and wherein the adaptation comprises at least one of:
modifying a primary transform of the transform by using a low-pass filter that passes half the frequencies of an input block,
deriving a maximum number of non-zero coefficients output by the transform from a scaling ratio, or
multiplying a minimum transform size of the transform by a scaling ratio.

4. The method of claim 1, wherein the set of coding tools comprises a partitioning, and wherein the adaptation comprises at least one of:
increasing a luma coding tree block size with a scaling ratio, and
increasing a minimum luma coding block size with a scaling ratio.

5. The method of claim 1, wherein the set of coding tools comprises a post-filter, and wherein the adaptation comprises using signaled post-filter parameters for a larger area than a coding block size.

6. An apparatus for video decoding, comprising:
one or more processors configured to:
obtain video data representative of a part of a picture;
decode, with a resolution that is constant, at least one syntax data element, wherein the at least one syntax data element specifies adapting a set of coding tools to behave as if the resolution were reduced without using reference picture resampling (RPR); and
decode, with the resolution that is constant, the video data using the set of coding tools.

7. The apparatus of claim 6, wherein the set of coding tools comprises two or more coding tools.

8. The apparatus of claim 6, wherein the set of coding tools comprises a transform, and wherein the adaptation comprises at least one of:
modifying a primary transform by using a low-pass filter cutting half the frequencies of an input block,
deriving a maximum number of non-zero coefficients from a scaling ratio, or
multiplying a minimum transform size by a scaling ratio.

9. The apparatus of claim 6, wherein the set of coding tools comprises a partitioning, and wherein the adaptation comprises at least one of:
increasing a luma coding tree block size with a scaling ratio, or
increasing a minimum luma coding block size with a scaling ratio.

10. The apparatus of claim 6, wherein the set of coding tools comprises a post-filter, and wherein the adaptation comprises using signaled post-filter parameters for a larger area than a coding block size.

11. A method for video encoding, the method comprising:
obtaining video data to encode, wherein the video data is representative of a part of a picture;
encoding, with a resolution that is constant, the video data using a set of coding tools; and
encoding, with the resolution that is constant, at least one syntax data element, wherein the at least one syntax data element specifies adapting the set of coding tools to behave as if the resolution were reduced without using reference picture resampling (RPR).

12. The method of claim 11, wherein the set of coding tools comprises two or more coding tools.

13. The method of claim 11, wherein the set of coding tools comprises a transform, and wherein the adaptation comprises at least one of:
modifying a primary transform of the transform by using a low-pass filter that passes half the frequencies of an input block,
deriving a maximum number of non-zero coefficients output by the transform from a scaling ratio, or
multiplying a minimum transform size of the transform by a scaling ratio.

14. The method of claim 11, wherein the set of coding tools comprises a partitioning, and wherein the adaptation comprises at least one of:
increasing a luma coding tree block size with a scaling ratio, or
increasing a minimum luma coding block size with a scaling ratio.

15. The method of claim 11, wherein the set of coding tools comprises a post-filter, and wherein the adaptation comprises using signaled post-filter parameters for a larger area than a coding block size.

16. An apparatus for video encoding, comprising:
one or more processors configured to:
obtain video data to encode, wherein the video data is representative of a part of a picture;
encode, with a resolution that is constant, the video data using a set of coding tools; and
encode, with the resolution that is constant, at least one syntax data element, wherein the at least one syntax data element specifies adapting the set of coding tools to behave as if the resolution were reduced without using reference picture resampling (RPR).

17. The apparatus of claim 16, wherein the set of coding tools comprises two or more coding tools.

18. The apparatus of claim 16, wherein the set of coding tools comprises a transform, and wherein the adaptation comprises at least one of:
modifying a primary transform of the transform by using a low-pass filter that passes half the frequencies of an input block,
deriving a maximum number of non-zero coefficients output by the transform from a scaling ratio, or
multiplying a minimum transform size of the transform by a scaling ratio.

19. The apparatus of claim 16, wherein the set of coding tools comprises a partitioning, and wherein the adaptation comprises at least one of:
increasing a luma coding tree block size with a scaling ratio, or
increasing a minimum luma coding block size with a scaling ratio.

20. The apparatus of claim 16, wherein the set of coding tools comprises a post-filter wherein the adaptation comprises using signaled post-filter parameters for a larger area than a coding block size.

* * * * *